United States Patent
Terry et al.

(10) Patent No.: US 8,400,566 B2
(45) Date of Patent: Mar. 19, 2013

(54) FEATURE OPTIMIZATION AND RELIABILITY FOR AUDIO AND VIDEO SIGNATURE GENERATION AND DETECTION

(75) Inventors: Kent Bennett Terry, Millbrae, CA (US); Regunathan Radhakrishnan, San Bruno, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 52 days.

(21) Appl. No.: 13/059,468

(22) PCT Filed: Aug. 17, 2009

(86) PCT No.: PCT/US2009/053989
§ 371 (c)(1),
(2), (4) Date: Feb. 17, 2011

(87) PCT Pub. No.: WO2010/021966
PCT Pub. Date: Feb. 25, 2010

(65) Prior Publication Data
US 2011/0261257 A1    Oct. 27, 2011

Related U.S. Application Data

(60) Provisional application No. 61/189,659, filed on Aug. 21, 2008.

(51) Int. Cl.
*H04N 17/00* (2006.01)
*H04N 9/475* (2006.01)

(52) U.S. Cl. .......................... 348/515; 348/192; 348/194

(58) Field of Classification Search .................. 348/515, 348/512, 192, 194, 180, 181; 375/224, 226, 375/371, 240.28; 714/732, 744, 819–821; 702/66, 71, 72, 122; 709/248

See application file for complete search history.

(56) References Cited

U.S. PATENT DOCUMENTS

| | | | | |
|---|---|---|---|---|
| 5,596,364 | A * | 1/1997 | Wolf et al. | 348/192 |
| 6,101,591 | A * | 8/2000 | Foster et al. | 711/219 |
| 6,480,902 | B1 * | 11/2002 | Yuang et al. | 709/248 |
| 6,806,909 | B1 * | 10/2004 | Radha et al. | 348/384.1 |
| 6,956,871 | B2 * | 10/2005 | Wang et al. | 370/503 |
| 8,015,480 | B2 * | 9/2011 | Abbott et al. | 715/201 |
| 2003/0198256 | A1 | 10/2003 | Wang | |
| 2007/0276670 | A1 * | 11/2007 | Pearlstein | 704/270 |

(Continued)

FOREIGN PATENT DOCUMENTS

| EP | 0648056 | 4/1995 |
|---|---|---|
| EP | 1729173 | 12/2006 |

(Continued)

OTHER PUBLICATIONS

Radhakrishnan, et al., "Audio and Video Signatures for Synchronization" 2008 IEEE International Conference on IEEE; pp. 1549-1552.

(Continued)

*Primary Examiner* — Victor Kostak

(57) ABSTRACT

Features are extracted from video and audio content that have a known temporal relationship with one another. The extracted features are used to generate video and audio signatures, which are assembled with an indication of the temporal relationship into a synchronization signature construct. the construct may be used to calculate synchronization errors between video and audio content received at a remote destination. Measures of confidence are generated at the remote destination to optimize processing and to provide an indication of reliability of the calculated synchronization error.

27 Claims, 9 Drawing Sheets

U.S. PATENT DOCUMENTS

| | | |
|---|---|---|
| 2008/0013614 A1 | 1/2008 | Fiesel |
| 2009/0096874 A1* | 4/2009 | Hayashi et al. ............... 348/192 |
| 2009/0304082 A1 | 12/2009 | Radhakrishnan |

FOREIGN PATENT DOCUMENTS

| | | |
|---|---|---|
| JP | 2006-528859 | 12/2006 |
| WO | 02065782 | 8/2002 |
| WO | 2005011281 | 2/2005 |
| WO | 2005053309 | 6/2005 |
| WO | 2006/102991 | 10/2006 |
| WO | 2008/066930 | 10/2008 |

OTHER PUBLICATIONS

Pinson, et al., "Reduced Reference Video Calibration Algorithms" Jan. 31, 2008, NTIA Report TR-08-433b, p. 3-11.

* cited by examiner

FEATURE OPTIMIZATION AND RELIABILITY FOR AUDIO AND VIDEO SIGNATURE GENERATION AND DETECTION

CROSS-REFERENCE TO RELATED APPLICATIONS

This application claims priority to U.S. Patent Provisional Application No. 61/189,659, filed 21 Aug. 2008, hereby incorporated by reference in its entirety.

TECHNICAL FIELD

The present invention pertains generally to systems and methods that process and distribute video and audio signals, and pertains more specifically to applications that generate, transmit or use data that convey information about the relative temporal alignment or synchronization of video and audio signals. Throughout this disclosure, the term "video signals" refers to signals that convey content intended for visual perception and the term "audio signals" refers to signals that convey content intended for aural perception. In one application, a system uses aspects of the present invention to reestablish proper synchronization between video and audio signals that was lost during processing and distribution of the content conveyed by the signals.

BACKGROUND ART

The relative temporal alignment of video and audio signals is an important factor in the perceived quality of audio-video content. One common example referred to as "lip sync" is the relative temporal alignment between the moving image of a person's lips and the sound of speech uttered by that person. Various studies have shown that, if sound is related to a moving image, human observers generally are either unaware of or are tolerant of differences in the relative temporal alignment of the image and sound if that difference is within some range. According to ITU-R Recommendation BT.1359-1, "Relative Timing of Sound and Vision for Broadcasting," if a sound precedes an associated visual event by no more than about 20 msec. or follows an associated visual event by no more than about 95 msec., the difference in temporal alignment is generally imperceptible. If a sound precedes an associated visual event by more than about 90 msec. or follows the associated visual event by more than about 185 msec., the difference in temporal alignment is perceived and generally found to be unacceptable. For purposes of this disclosure, video and audio signals are regarded as having the proper temporal alignment or as being in synchronization with one another if any difference in the relative alignment is either imperceptible or at least acceptable to a broad class of human observers.

Unfortunately, many methods and systems that process, distribute and present audio-video content often include mechanisms that cause proper synchronization to be lost. In broadcasting, for example, video and audio signals are usually synchronized at the point of signal capture such as in a studio but these signals are often processed prior to broadcast transmission and this processing can cause loss of synchronization. For example, analog video and audio signals may be converted into digital forms and processed by perceptual encoding methods to reduce the bit rate or bandwidth needed to transmit the content. Processes such as chroma-keying may be used to merge images from multiple video signals. Ancillary audio signals may be mixed with or replace the original audio signal. Many of these and other processes introduce delays in the signal processing paths. If processing delays are not precisely equal in the video signal processing path and the audio signal processing path, loss of synchronization is inevitable. In addition, synchronization is often lost if video and audio signals are distributed independently through different channels.

To avoid these problems, a variety of techniques have been proposed and used that search for matches between received video/audio content and reference video/audio content known to be synchronized, calculate a change in temporal alignment between the received video and audio content relative to the alignment between reference content, and delay the received video content or the received audio content to reestablish synchronization. One limitation of other known techniques is that they do not account for the reliability of the match or the reliability of the calculated change in alignment.

DISCLOSURE OF INVENTION

It is one object of the present invention to provide for maintaining or reestablishing synchronization between video and audio signals that can avoid limitations of the prior art.

It is another object of the present invention to provide a signature for video and audio signals that can be used in various applications including video-audio content identification and verification, and synchronization of other signals to video and audio signals.

The present invention provides for an audio/video (A/V) synchronization signature construct that conveys one or more video signatures representing one or more features of the video content, one or more audio signatures representing one or more features of the audio content, and the temporal alignment between the video and audio content.

The present invention is set forth in the independent claims. Features of some advantageous implementations are set forth in the dependent claims.

The present invention and its preferred implementations may be better understood by referring to the following discussion and the accompanying drawings. The contents of the following discussion and the drawings are set forth as examples only and should not be understood to represent limitations upon the scope of the present invention.

MODES FOR CARRYING OUT THE INVENTION

A. Overview

Figure 1:
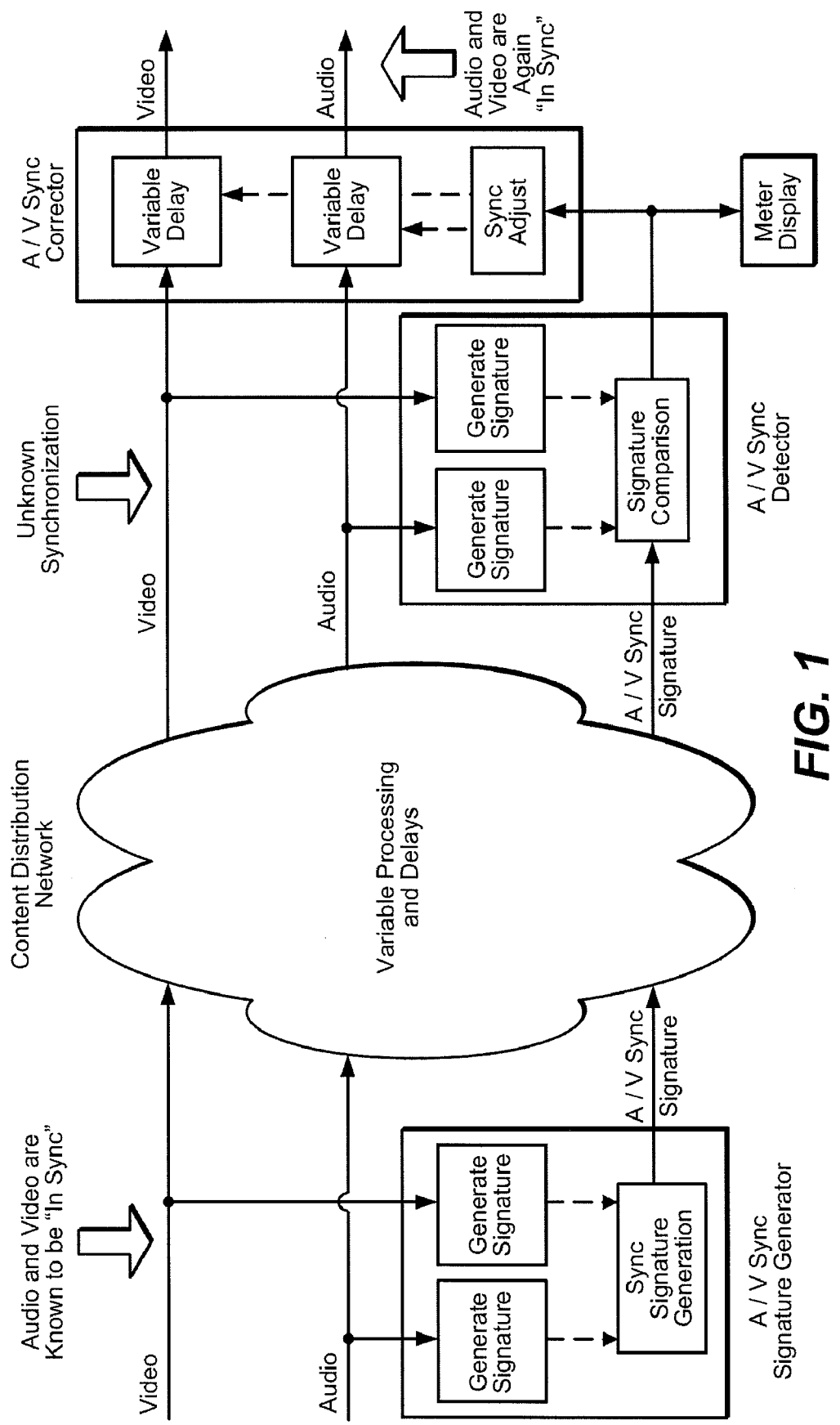
FIG. 1 is a schematic block diagram of an exemplary system that incorporates aspects of the present invention to reestablish synchronization between video and audio signals such as broadcast signals that are distributed in real time.
Figure 2:
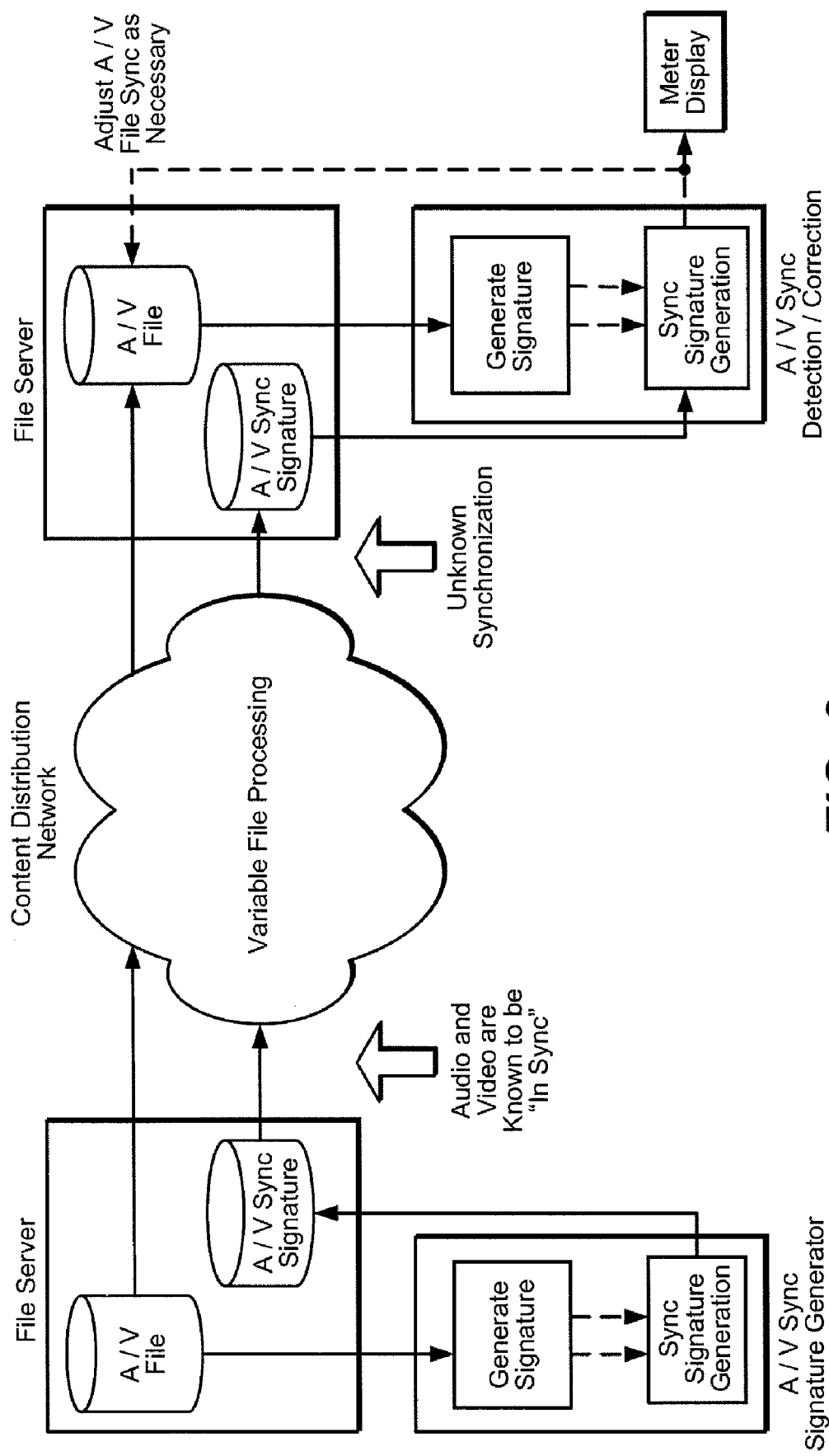
FIG. 2 is a schematic block diagram of an exemplary system that incorporates aspects of the present invention to reestablish synchronization between video and audio signals such as recorded signals that can be distributed in non-real time.

FIGS. 1 and 2 are schematic block diagrams of exemplary systems that incorporate aspects of the present invention and can be used to detect and reestablish synchronization between video and audio signals. Each of these systems incorporate functions to generate, distribute and apply a synchronization signature construct, which is a logical structure of data representing video and audio content and the temporal alignment between this content. This construct may be implemented by essentially any data structure that is capable of conveying the required information. These functions are introduced here and discussed in more detail below.

The system illustrated in FIG. 1 may be used with video and audio content that is distributed in real time such as content that is conveyed by broadcast signals. Real-time distribution includes real-time presentation or playback. The system illustrated in FIG. 2 may be used with video and audio content that is not distributed in real time such as content that is received and stored by multimedia servers. Non-real-time distribution may or may not include a real-time presentation or playback of the content. In this disclosure, the term "real time" refers to the rate video and audio content is generated or captured and subsequently played back. The term "non-real time" refers to rates that are faster or slower than real time.

Although not shown in any figure, a system may be configured to allow devices that operate in real time to operate with devices that operate in non-real time. For example, the synchronization signature constructs generated by a real-time A/V Sync Signature Generator shown in FIG. 1 can be configured so that they can be used by a device that reads and processes recorded content in non-real time. As another example, the synchronization signature constructs generated by the non-real-time A/V Sync Signature Generator shown in FIG. 2 can be configured so that they can be used by a content editor or transmitter that processes the content in real time.

1. Real-Time System

The real-time system that is illustrated in FIG. 1 generates and distributes the synchronization signature construct in real time. Implementations of the present invention for real-time systems may need processes with computational complexity, memory and buffer requirements that are lower than those that can be considered for use in non-real-time systems.

Referring to FIG. 1, an A/V Sync Signature Generator examines or analyzes the content of video and audio signals and extracts one or more features of the content to generate a video signature and an audio signature. These two signatures are assembled into a synchronization signature construct. The Signature Generator receives the video and audio signals in real time and the video and audio signals are subsequently distributed in real time; therefore, the Signature Generator generates the synchronization signature construct in real time.

It is anticipated that, for most implementations, the video and audio signals that are examined by the A/V Sync Signature Generator will have the desired temporal alignment with one another; however, this is not required in principle. If desired, an implementation of the A/V Sync Signature Generator can account for a known shift in alignment between the video and audio signals by including an explicit indication in the synchronization signature construct of the actual temporal alignment. This explicit indication can be used by subsequent processes to make whatever adjustments are necessary to achieve the same results as if the two signals did have the desired alignment when the synchronization signature construct was generated. If the video and audio signals are known to be in proper alignment, no explicit information may be necessary and the relative temporal alignment of the two signals can be conveyed implicitly.

Preferably, the choice of features or the extraction processes used to obtain them are resistant to or tolerant of processes that may subsequently modify the signals that convey the video content, the audio content or the synchronization signature construct. Some examples of these processes are mentioned below. The video signal, the audio signal and a signal conveying the synchronization signature construct may also be subjected to varying delays in signal distribution. For example, signal processing like perceptual encoding may impose delays in a signal processing path.

The video and audio content that is delivered to the A/V Sync Detector may differ from the video and audio content used to generate the synchronization signature construct for reasons that are discussed below. To clarify this distinction, the team "destination" is used herein as needed to identify signals, content and signatures that are present at the A/V Sync Detector, and the term "reference" is used herein as needed to identify signals, content and signatures that are present at the A/V Sync Signature Generator.

The A/V Sync Detector receives video and audio signals that convey destination video and audio content. It also receives a signal conveying the synchronization signature construct. It examines or analyzes the destination content of the received video and audio signals to extract one or more features to generate a destination video signature and a destination audio signature, obtains the reference video signature and reference audio signature from the synchronization signature construct, compares the destination video signature with the reference video signature and compares the destination audio signature with the reference audio signature, and determines whether there has been any shift in the relative temporal alignment of the received video and destination audio signals as compared to the temporal alignment that existed when the synchronization signature construct was generated. Any shift in alignment may be presented by a meter or other display, and it may be corrected by imposing a calculated delay on one or both of the received destination video and destination audio signals to bring the two into proper temporal alignment. The A/V Sync Detector receives the destination video and destination audio signals in real time and the relative temporal alignment of the destination video and destination audio signals are adjusted in real time; therefore, the A/V Sync Detector generates the destination video and destination audio signatures in real time.

2. Non-Real-Time System

The non-real-time system illustrated in FIG. 2, which is an example of a file-based system that distributes the video and audio signals in non-real time, may not need to generate and distribute the synchronization signature construct in real time. As a result, implementations of the present invention for this non-real-time system may be able to use processes with computational complexity, memory and buffer requirements that are significantly higher than can be used practically in real-time systems.

Referring to FIG. 2, video and audio content are recorded in one or more files that are stored by one or more file servers. For ease of description, these one or more file servers are referred to as the reference file server. The video and audio content are retrieved from the reference file server in such a manner that the A/V Sync Signature Generator receives the video-audio content in synchronization with one another. The A/V Sync Signature Generator examines or analyzes the video and audio content and extracts one or more features of the content to generate a video signature and an audio signature. These two signatures are assembled into a synchronization signature construct. The Signature Generator may receive the video and audio signals in non-real time and generate the synchronization signature construct in non-real time. The synchronization signature construct may be recorded in one or more files that are stored by the reference file server or by a different file server.

Just as for the real-time system described above, the features or the processes used to obtain them preferably are resistant to or tolerant of processes that may subsequently modify signals that convey the video content, the audio content or the synchronization signature construct. In typical applications for this non-real-time system, the signals conveying the video content, the audio content and the synchronization signature construct are subjected to varying delays in signal processing and distribution. In the example shown in the figure, these signals are distributed through a network and the destination content and destination signatures they convey are recorded in one or more files that are stored on one or more file servers, which are referred to here as the destination file server.

The destination video and destination audio content and the synchronization signature construct may be retrieved from the destination file server and delivered to the A/V Sync Detector in such a manner that synchronization between the destination video-audio content cannot be assured. The A/V Sync Detector examines or analyzes the retrieved destination video and destination audio content to extract one or more features and generate a destination video signature and a destination audio signature. The A/V Sync Detector obtains the reference video signature and the reference audio signature from the retrieved synchronization signature construct, compares the destination video signature with the reference video signature, compares the destination audio signature with the reference audio signature, and determines whether the relative temporal alignment between the destination video and destination audio content as retrieved from the destination server differs from the relative temporal alignment that existed when the synchronization signature construct was generated. Any difference in alignment may be presented by a meter or other display, and it may be corrected by delaying or advancing one or both of the retrieved destination video and destination audio content to bring the two into proper temporal alignment. If desired, the generation of the destination signatures and the adjustment of the relative temporal alignment of the retrieved destination video and destination audio content may be done in real time. If the adjustments needed to restore synchronization can be recorded in one or more files for subsequent use, the A/V Sync Detector need not generate the video and audio destination-signatures in real time.

B. Signature Generation

Figure 3:
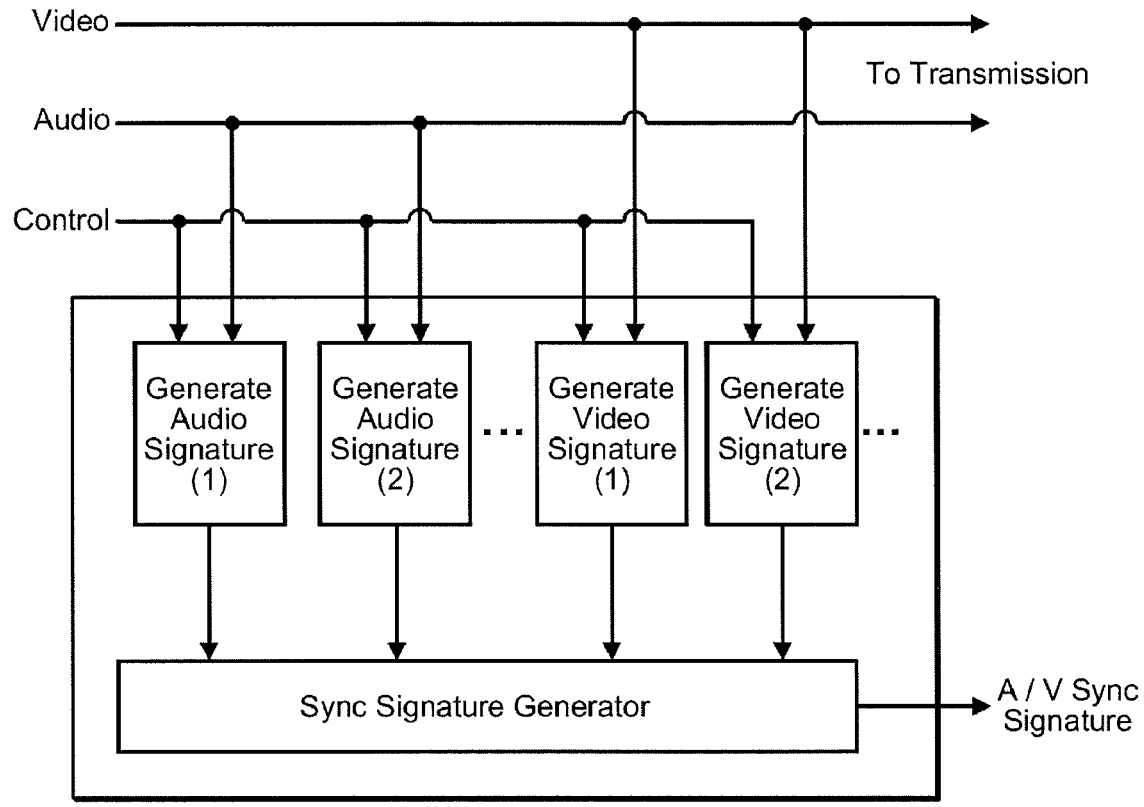
FIG. 3 illustrates an exemplary device that generates a synchronization signature construct for video and audio signals.

FIG. 3 illustrates an exemplary device that generates a synchronization signature construct by extracting features from reference video signals and reference audio signals that are synchronized. The synchronization signature construct includes one or more reference video signatures representing one or more features of the reference video signal, a one or more reference audio signatures representing one or more features of the reference audio signal, and an indication of the relative temporal alignment of video and audio features used to generate the reference signatures. The video and audio signatures that are included in the synchronization signature construct are adapted in response to a control signal as explained below. The synchronization signature construct may convey the relative temporal alignment implicitly or explicitly.

1. Video and Audio Signatures

The one or more video signatures are generated in response to one or more video features that are extracted from the video content. The one or more audio signatures are generated in response to one or more audio features that are extracted from the audio content. The video and audio signatures may be generated or derived from the content using essentially any process or transform capable of generating signatures that differ from the content. The amount of data that is required to represent the signatures is less than the amount of data that is required to represent the content. Preferably, signatures are generated such that the amount of data needed to represent the signatures is no more than what is required to correlate corresponding reference and destination content with a sufficiently high degree of confidence.

In principle, essentially any desired process or transform may be applied to any type of feature to generate the video and audio signatures. In preferred implementations, however, several considerations influence what features should be selected and what processes or transforms should be used.

One consideration is that the selected features should be non-stationary for the video and audio content that is used to generate the signatures. This consideration applies also to the type of content that can be processed. Synchronization signature constructs that are generated from features extracted from static or stationary content generally cannot be used to correlate corresponding reference and destination content; however, implementations of the present invention can generally handle signals with static content because this type of signal generally does not manifest any synchronization problems. If an image or a sound does not change during some interval, there is nothing to synchronize.

Another consideration is that the selected features should provide the temporal resolution needed for the application. For content re-synchronization, the temporal resolution should be no longer than about 20 msec. For content identification or verification, the temporal resolution may be 10 seconds, a minute or even more. In many implementations, video content is arranged in frames and video signatures are generated from features that are extracted from individual frames. A common frame rate is about 30 Hz, providing a temporal resolution of about 30 msec. The resolution needed for synchronization can be provided by extracting audio features at a constant rate that is two or three times higher than the video frame rate. If instead video and audio features are extracted in response to the detection of some event in the content, then the resolution of the event-detection process should be sufficient to support the intended application.

Yet another consideration is that the selected features and transforms used to generate the video and audio signatures should be resistant to or tolerant of processes that may modify the video content, the audio content or the synchronization signature construct. Examples of these processes are mentioned below. This resistance allows detection signatures to be generated from the modified content that are similar if not identical to the signatures generated from the original unmodified content.

Another consideration is that the type and number of features and the choice of transforms or processes should be determined according to the needs of the applications that will use the synchronization signature construct, the characteristics of the communication channel used to distribute the synchronization signature construct, and any demands or limitations on computational complexity.

A one-way transform may be used to generate either or both of the video and audio signatures. In this disclosure, the term "one-way transform" refers to a transform that derives or generates a signature from content in such a way that the recovery of a humanly recognizable version of the content from the signature by some inverse transform is either impossible or is computationally impractical. For the purpose of this disclosure, an inverse transform, if any exists, is deemed to be computationally impractical if its computational complexity is at least two orders of magnitude higher than the computational complexity of the forward or one-way transform. One example of a one-way transform for video and audio content that is used in a preferred implementation is described in international patent application number PCT/US2007/024744 entitled "Extracting Features of Video and Audio Signal Content to Provide a Reliable Identification of the Signals" by Regunathan Radhakrishnan, et al., filed Nov. 29, 2007. This is discussed below in more detail.

The selection of transforms and features that are used to generate the video and audio signatures may be invariant or the selection may be adaptive. For example, some video features or transforms may work well when there is considerable motion in the image conveyed by the video signal but other features or transforms may perform better when there is little motion. Similarly, some audio features or transforms may work well for speech but others are better suited to non-speech audio. The features or transforms may be selected or modified adaptively in response to a control signal as shown in FIG. 3. Suitable control signals may be derived from an analysis of video or audio content such as a detection of image motion or a detection of speech as mentioned above, from an indication of signal format that specifies what metadata is present with the video and audio content such as MPEG-2 video motion vectors or Dolby Digital audio subband exponents, an indication of the intended application for the signatures, or an indication of likely processes that will modify video or audio content subsequent to signature generation. The control signal may also be adapted to select features and transforms that optimize performance for certain applications or signal-modification processes by simulating various signal processing conditions, measuring the performance of different signatures under these conditions, and identifying the signatures that perform best.

Preferred implementations of video and audio signature generators are discussed below. For these particular implementations, individual signatures of video and audio content correspond to segments of the video/audio signal. Each segment of the video/audio signal conveys a frame of video content and a segment of audio content. This particular correspondence between video/audio segments, video frames, audio segments and signatures is presented as only an example. Other arrangements are possible and sometimes preferred.

a) Video Signature Generator

Figure 4:
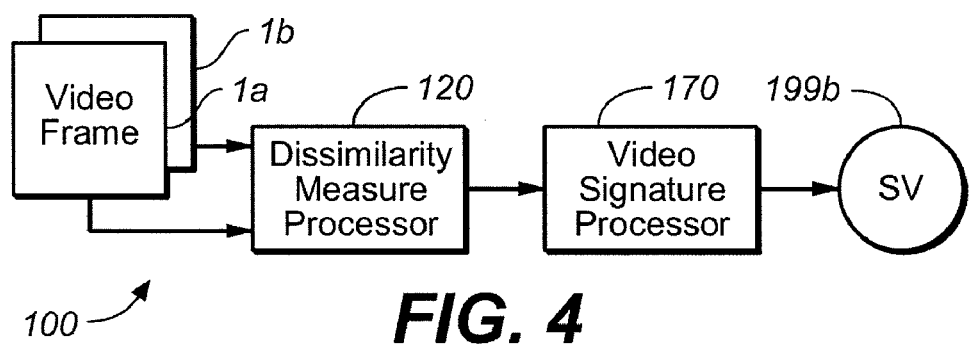
FIG. 4 is a schematic block diagram of one implementation of a video signature generator.

FIG. 4 is a schematic block diagram of a preferred implementation of a video signature generator 100. The dissimilarity measure processor 120 examines the content of two video frames 1a, 1b within a sequence of video frames and generates intermediate values that represent one or more measures of dissimilarity between all or a portion of the two frames. If the content of each video frame is represented by an array of values expressing the intensity of discrete picture elements or pixels, for example, the intermediate values may be an array of differences between the average or standard deviation of intensities for groups of pixels. The video signature processor 170 applies a hash function to the intermediate values to generate a video signature (SV) 199b that identifies the content of the video frames.

The components of the video signature generator 100 may be implemented in a variety of ways. Preferred implementations generate a signature that is relatively insensitive to modifications of video content that have little or no perceptual effect. If modifications to video content have no significant effect on the perceived image, then preferably these modifications also have no significant effect on the generated signature. Some measure of difference between two video signatures is commensurate with a measure of difference between the two contents from which the signatures are generated. A few exemplary implementations are discussed below.

The implementations discussed below calculate intermediate values representing one or more measures of dissimilarity between video frames because the use of dissimilarity measures increases the sensitivity of the generated signature to motion and other changes in original content but eliminates or reduces sensitivity to modifications from subsequent processes such as those that change brightness or contrast, that convert between different color spaces or that apply color correction.

The intermediate values may be calculated for any two frames 1a, 1b of video content. The two frames may be adjacent video frames within a sequence of frames or they may be separated from one another by one or more intervening frames. If the two frames are separated by a specified interval of time rather than by a specified number of intervening frames, the intermediate values calculated for these two frames will generally be more resistant to modifications caused by coding process that change the video frame rate.

(1) Dissimilarity Measure Processor

Figure 5A:
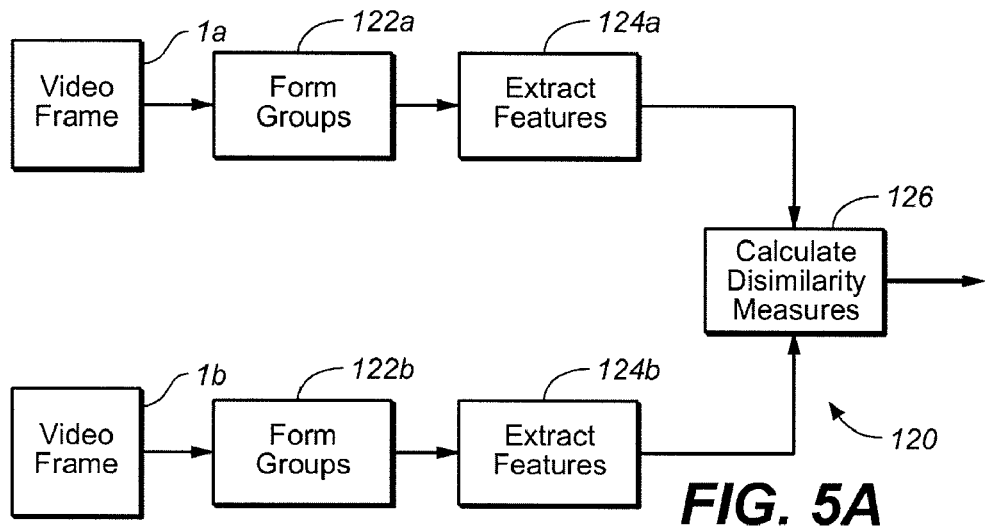
FIGS. 5A-5C are schematic block diagrams of processes that may be used to generate dissimilarity measures representing differences between two frames of video content.
Figure 5B:
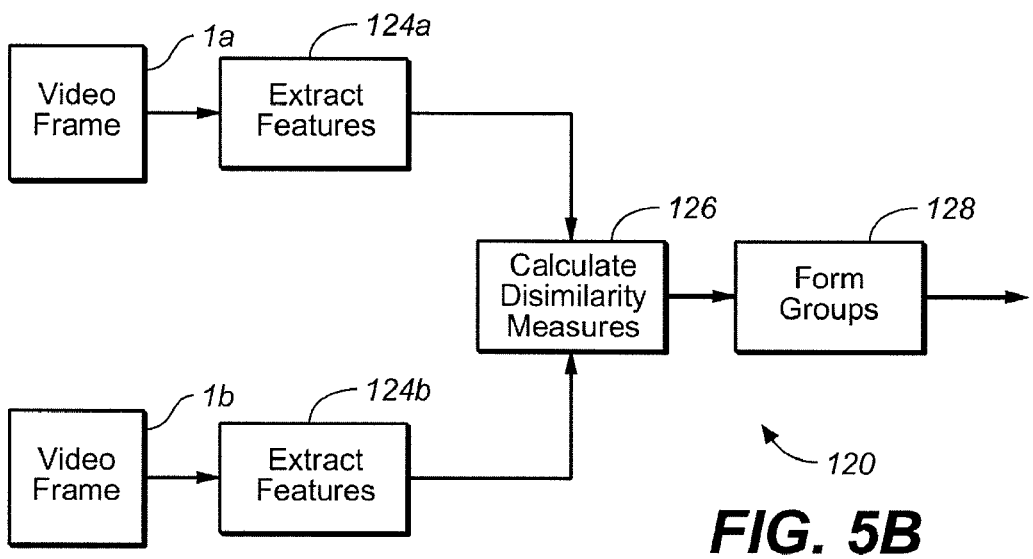
Figure 5C:
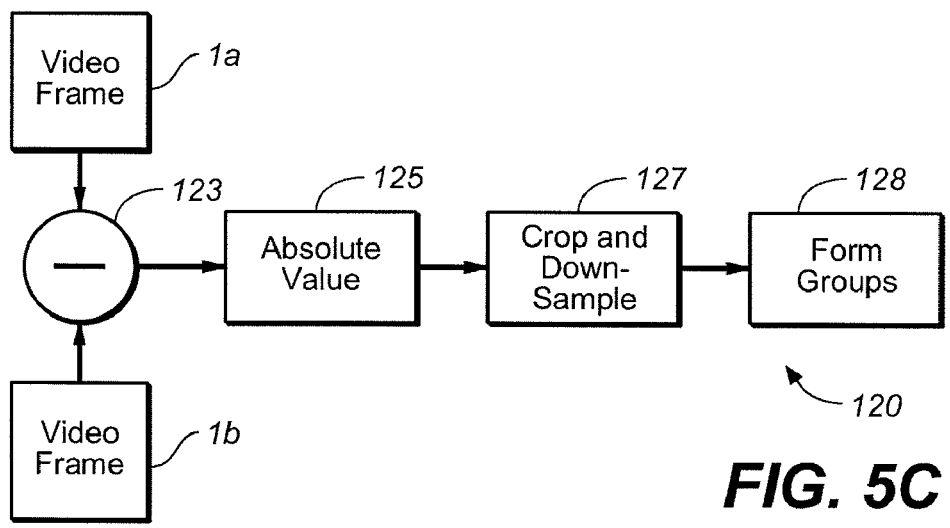

A few exemplary implementations of the dissimilarity measure processor 120 are illustrated in FIGS. 5A to 5C. Referring to FIG. 5A, the component 122a forms one or more groups of pixels from the video frame 1a and the component 124a extracts one or more features from each of these groups of pixels and calculates a value R representing each feature. The component 122b forms one or more groups of pixels from the video frame 1b and the component 124b extracts one or more features from each of these groups of pixels and calculates a value R representing each feature. The component 126 calculates intermediate values Q that represent the dissimilarity measures between the values R for corresponding features and corresponding groups of pixels in the two video frames 1a, 1b.

(a) Pixel Group Formation

The components 122a and 122b may form pixel groups in essentially any way that may be desired. A few alternatives are discussed below. If desired, the information in the video frame that is used to generate the video signature may be limited to only a portion of the total image to avoid changes created by any processes that add letterboxes or graphics to edges or corners of the image. This may be achieved in a variety of ways such as by cropping the image prior to feature extraction, by cropping the array of values R that represent the extracted features after they have been calculated, or by cropping the array of dissimilarity values calculated from the values R. Preferably, this is achieved by cropping the image prior to feature extraction.

For video applications such as television, a suitable cropping selects a central portion of the image so that any logos or other graphical objects inserted into the video content near the edges of the image do not affect the extracted features. Cropping may also eliminate modifications to the image due to conversion between progressive-scan and interlaced-scan formats and between high-definition (HD) and standard definition (SD) formats. Cropping for one particular HD to SD format conversion is discussed in the following paragraphs.

If original video content in HD format with a resolution of 1080×1920 pixels is converted into SD format with a resolution of 480×640 pixels, for example, the original image can be cropped to select the central portion of the original image that remains in the converted image. An appropriate cropping removes 240 pixels from the left-hand edge and removes 240 pixels from right-hand edge of the original HD-format image to obtain an image with a resolution of 1080×1440 pixels having the same aspect ratio as the SD-format image. The cropped area may be adjusted to remove additional areas of the image that may be modified with logos or graphical objects as mentioned above.

The array of pixels may also be down-sampled to reduce sensitivity to modifications that can occur when frames of video are converted between different formats. In television applications, for example, the images may be down sampled to a resolution of 120×160 pixels, which is a convenient choice for HD and SD formats, and for progressive-scan an interlaced-scan formats. This down-sampling may be implemented by examining parameters or other metadata conveyed with the video content to determine the horizontal and vertical resolution of the images conveyed in the video frames, selecting a factor in response to these resolutions, and down-sampling the images by an amount equal to the factor. For the examples discussed here, a factor equal to nine is selected for the cropped HD-format image and a factor equal to four is selected for the SD-format image.

For example, suppose the content of an original video signal is in HD format with a resolution of 1080×1920 pixels. This content can be cropped to an image having a resolution of 1080×1440 pixels as described above and then down sampled by a factor of nine to a resolution of 120×160 pixels. Features can be extracted from this low-resolution image. Suppose further that the original video signal is converted to SD format with a resolution of 480×640 pixels. This converted image can be down sampled by a factor of four to a resolution of 120×160 pixels, allowing essentially the same features to be extracted from the converted signal as was done for the original signal. The same down sampling can be used to accommodate conversions from SD to HD formats and between progressive-scan and interlaced-scan formats. If appropriate down sampling is used, the feature extraction process and the subsequent signature generation process are insensitive to modifications that occur from conversions between formats.

If a video signal conveys content in an interlaced-scan format in which frames of video are arranged in two fields, it may be converted to a progressive-scan format before extracting features. Alternatively, greater independence from the choice of scan format can be achieved by extracting features from only one of the fields in an interlaced-scan frame. For example, features can be extracted from only the first field in a frame or from only the second field in the frame. Video content in the other field would be ignored. This process avoids the need to convert to a progressive-scan format before extracting features.

Figure 6A:
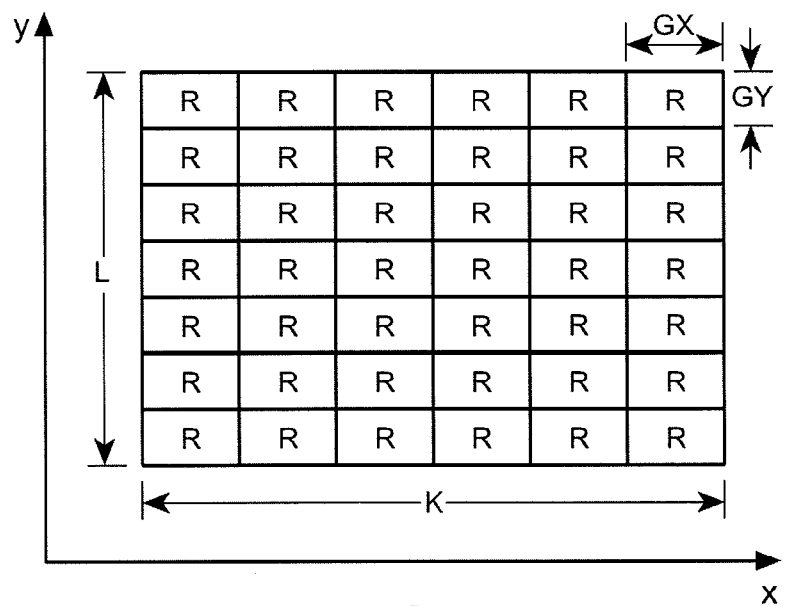
FIGS. 6A-6B are schematic block diagrams of a set of intermediate values in a low-resolution image.

In one implementation, pixel groups are formed in a down-sampled image having a resolution of 120×160 pixels. Referring to FIG. 6A, for example, the pixel groups are uniform in size and are GX pixels wide and GY pixels high. The horizontal size GX of the groups is chosen such that K·GX=RH and the vertical size GY of the groups is chosen such that L·GY=RV where RH and RV are the horizontal and vertical dimensions of the image, respectively, in each video frame. One suitable choice of values is GX=8, GY=8, K=15 and L=20. This describes a 15×20 array of groups, each group having a size of 8×8 pixels in the down-sampled image.

A similar result can be obtained by forming pixel groups in the original image with a size that is adjusted in response to the format of the image in the video frame. Continuing the examples described above, HD-format images are cropped to a size of 1080×1440 pixels and pixel groups are formed in the cropped image having a size of 72×72 pixels. This yields a 15×20 array of pixel groups. For images in SD format, pixel groups are fanned in the original image having a size of 32×32 pixels, which yields a 15×20 array of pixel groups.

Figure 6B:
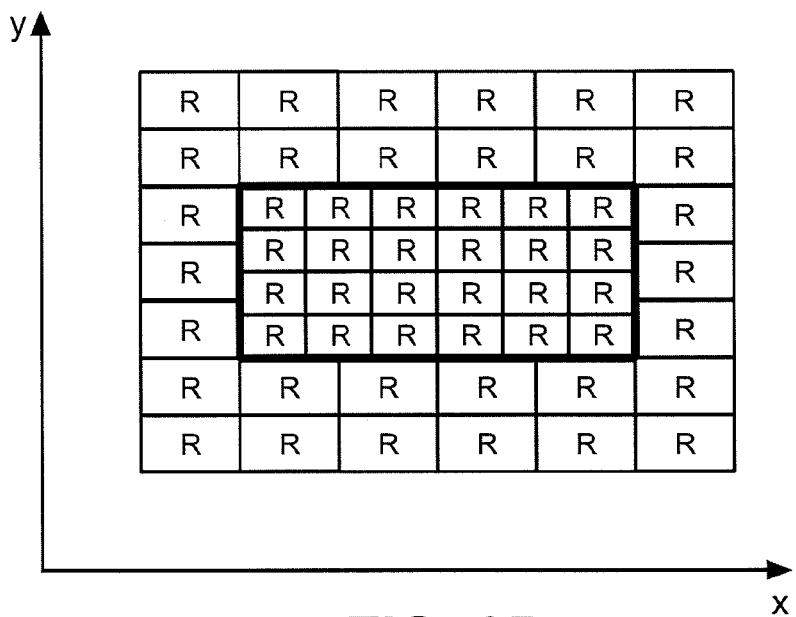

FIG. 6B illustrates groups of pixels that are not uniform in size. A 6×4 array of smaller pixel groups constitutes the central portion of the image. A set of larger pixel groups surrounds the groups in the central portion. This type of arrangement can be used advantageously with video frame information that has content in the central portion of each image that is perceptually more significant.

Pixel groups may be of essentially any size or shape. For example, the central portion of the image shown in FIG. 6B, which is surrounded by a rectangle drawn with wider lines, could constitute a single pixel group and the remaining portion of the image could constitute another pixel group.

Preferably, the pixels are low-pass filtered to reduce sensitivity to changes caused by any variations in pixel group alignment that may occur as the result of video content modification. The filtering may be performed one or more times during the pixel group formation process. For example, the pixels may be low-pass filtered before the down-sampling operations discussed above, immediately after the down-sampling operations and/or immediately after the formation of pixel groups. The size of the filter should be chosen to balance a trade off between resistance to changes in alignment on one hand and sensitivity to changes in video content on the other hand. A larger filter increases resistance to changes in alignment. A smaller filter increases the sensitivity to changes in video content. If the low-pass filter is applied to the 120×160 down-sampled image discussed above, empirical studies have shown good results can be obtained by using a 3×3 two-dimensional filter with all filter tap coefficients equal to one.

The following discussion of feature extraction refers to the exemplary grouping shown in FIG. 6A.

(b) Feature Extraction

The components 124a and 124b extract one or more features from each pixel group and calculate a value R that represents each feature.

If each video frame conveys a monochromatic image, the features may be extracted from data e that represents the intensities of individual pixels. If each video frame conveys a color image comprising pixels represented by red, green and blue (RGB) values, for example, separate features may be extracted from the data e that represents each of the red, green, and blue pixel components. Alternatively, features may be extracted from data e that represents pixel luminance or brightness derived from the data that represents the red, green, and blue components.

One feature that may be extracted is average pixel intensity. A value $R_{AVE}$ representing this feature may be obtained from the following expression:

$$R_{AVE}(k, l) = \frac{1}{GX \cdot GY} \sum_{i=k \cdot GX}^{(k+1) \cdot GX - 1} \sum_{j=l \cdot GY}^{(l+1) \cdot GY - 1} e(i, j) \quad (1)$$

for $0 \leq k < K; 0 \leq l < L$ where $R_{AVE}(k, l)$=average intensity of pixels in a group of pixels (k, l);
e(i, j)=intensity of pixel (i,j) within the group;
GX=width of pixel groups expressed in numbers of pixels;
GY=height of pixel groups expressed in numbers of pixels;
K=horizontal resolution of the image, expressed in numbers of groups; and
L=vertical resolution of the image, expressed in numbers of groups.

Another feature that may be extracted is the standard deviation of pixel intensity. Alternatively, the variance or square of the standard deviation may be used. A value $R_{SD}$ representing standard deviation may be obtained from the following expression:

$$R_{SD}(k, l) = \sqrt{\frac{1}{GX \cdot GY} \sum_{i=k \cdot GX}^{(k+1) \cdot GX - 1} \sum_{j=l \cdot GY}^{(l+1) \cdot GY - 1} [e(i, j) - R_{AVE}(k, l)]^2} \quad (2)$$

for $0 \leq k < K; 0 \leq l < L$ where $R_{SD}(k, l)$=standard deviation of pixel intensities in a group of pixels (k, l).

Another feature that may be extracted is a histogram of pixel intensities. A set of values $R_{HIST}$ that represents this feature may be obtained by counting the number of pixels that have a particular intensity for each intensity within the range of possible intensities.

Yet another feature is the amplitude and/or phase of the spectrum. A set of values $R_{SPECTRUM}$ representing a spectrum can be obtained by applying a two-dimensional Fourier transform to the group of pixel intensities.

No particular feature is critical to the present invention; however, empirical results have shown that averages and standard deviations of pixel intensities are good choices for many applications.

If desired, the values R representing extracted features may be arranged in groups for subsequent processing. For example, spectral features represented by the set of values $R_{SPECTRUM}$ may be organized into groups according to frequency or phase.

Furthermore, features may be extracted from the calculated values R. For example, the standard deviation of average intensity $R_{AVE}$ or of spectral values $R_{SPECTRUM}$ may be calculated.

(c) Dissimilarity Measure Calculation

The component 126 may calculate the intermediate values Q representing measures of dissimilarity E in a variety of ways. The choice of the measure is not critical in principle to the present invention but some measures may perform better depending upon the features that are extracted by the components 124a and 124b. Empirical studies may be needed to make an appropriate choice; however, the two measures described below have been found to give good results in a wide range of applications.

One measure of dissimilarity is the absolute value of the difference between values R representing corresponding features for corresponding groups of pixels in two different frames. This measure may be calculated from the following expression:

$$E(k, l, f_1, f_2) = |R(k, l, f_1) - R(k, l, f_2)| \text{ for } 0 \leq k < K; 0 \leq l < L \quad (3a)$$

where $E(k, l, f_1, f_2)$=dissimilarity between frames $f_1$ and $f_2$ in pixel group (k, l); and
R(k, l, x)=value representing extracted feature of pixel group (k, l) in frame x.

If the extracted feature is represented by a value having two or more elements such as, for example, amplitudes in $R_{SPECTRUM}$ representing a spectral feature, a measure of dissimilarity may be calculated from the sum of the absolute values of differences between elements in the values R representing corresponding features for corresponding groups of pixels in two different frames. This measure may be calculated from the following expression:

$$E(k, l, f_1, f_2) = \sum_z |R(k, l, z, f_1) - R(k, l, z, f_2)| \quad (3b)$$

for $0 \leq k < K; 0 \leq l < L$ where R(k, l, z, x)=element z in the value R for pixel group (k, l) in frame x.

If desired, a composite measure of dissimilarity for two or more groups of pixels in the frames may be calculated from a similar expression as follows:

$$E(f_1, f_2) = \sum_k \sum_l \sum_z |R(k, l, z, f_1) - R(k, l, z, f_2)| \quad (3c)$$

where $E(f_1, f_2)$ = composite measure dissimilarity between frames $f_1$ and $f_2$; and the limits of summation for k and l are chosen to include the desired groups. This particular example assumes the values R have more than one element. If the values have only one element, the summation over z is omitted.

Another measure of dissimilarity is the square of the difference between values R representing corresponding features for corresponding groups of pixels in two different frames. This measure may be calculated from the following expression:

$$E(k,l,f_1,f_2) = (R(k,l,f_1) - R(k,l,f_2))^2 \text{ for } 0 \leq k < K;\ 0 \leq l < L \quad (4a)$$

If the extracted feature is represented by a value having two or more elements, a measure of dissimilarity may be calculated from the sum of the squares of differences between elements in the values R representing corresponding features for corresponding groups of pixels in two different frames. This measure may be calculated from the following expression:

$$E(k, l, f_1, f_2) = \sum_z (R(k, l, z, f_1) - R(k, l, z, f_2))^2 \quad (4b)$$
$$\text{for } 0 \leq k < K;\ 0 \leq l < L$$

If desired, a composite measure of dissimilarity for two or more groups of pixels in the frames may be calculated from the following expression:

$$E(f_1, f_2) = \sum_k \sum_l \sum_z (R(k, l, z, f_1) - R(k, l, z, f_2))^2 \quad (4c)$$

where the limits of summation for k and l are chosen to include the desired groups. This particular example assumes the values R have more than one element. If the values have only one element, the summation over z is omitted.

In one implementation, the intermediate values Q are set equal to the calculated measures of dissimilarity E. An alternative is discussed below.

(d) Alternative Implementation

If a difference between average pixel intensities is the only dissimilarity measure that is used for signature generation, the dissimilarity measure processor 120 may be implemented as shown in FIGS. 5B and 5C. In these implementations, pixel intensities or average intensities are extracted from the video frames 1a and 1b, measures of dissimilarity between the extracted features are calculated and the dissimilarity measures are formed into groups for subsequent signature generation.

In the exemplary implementations shown in FIGS. 5B and 5C, frames of video content are represented by an array of discrete pixels, the dissimilarity measure processor 120 obtains difference images each comprising an array of differential elements Δ by calculating the difference between corresponding pixels in two video frames. If each video frame conveys a color image comprising pixels represented by red, green and blue (RGB) values, for example, the differential elements may be calculated from the differences between respective red, green, and blue values for corresponding pixels. Preferably, the differential elements are calculated from the absolute differences between a luminance or brightness of corresponding pixels that is derived from the red, green, and blue values. If each video frame conveys a monochromatic image, the differential elements may be calculated from the difference between the intensities of corresponding pixels.

If desired, differential elements may be limited to only a portion of the total image to avoid changes created by any processes that add letterboxes or graphics to edges or corners of the image. This may be achieved by cropping the image prior to calculating the differential elements or by cropping the array of differential elements after they have been calculated.

The resolution of the difference image may also be changed as described above for pixel group formation. This may be done by modifying data in the video frames prior to calculating the differential elements or by modifying the differential elements after they have been calculated.

Referring to the implementation illustrated in FIG. 5C, the component 123 calculates the difference between values of corresponding pixels in a video frame 1a and a video frame 1b and the component 125 obtains a set of the differential elements Δ from the absolute values of the pixel differences. The component 127 performs cropping and down-sampling. The cropping operation retains only a central part of the difference image by removing differential elements near the top, bottom, right-hand and left-hand edges of the difference image. The down-sampling operation down samples the cropped difference image to generate an array of differential elements that has a specified size of 120×160 pixels regardless the format of the input video frames. This particular size is only exemplary. The component 128 forms the differential elements Δ into groups and calculates the average value for the differential elements in each group. If desired, the down-sampling and group-formation operations could be combined as explained above.

The operations that calculate differences, down-sample, crop and form groups may be performed in other orders. For example, the differential elements Δ may be calculated by first down sampling the contents of two video frames, cropping the two down-sampled images, forming groups of pixels in the cropped images, calculating an average intensity for the pixels in each group, and then calculating differences between corresponding average intensities in the two images.

Referring to the group formation operation 128 shown in FIG. 5C, the differential elements Δ are grouped into regions of a difference image where each region is GX elements wide and GY elements high. Intermediate values Q are derived from the intensities of the differential elements Δ by calculating the average intensity of the elements in each region. These intermediate values constitute a low-resolution representation of the difference image that has a resolution of K×L intermediate values. This is analogous to the formation of pixel groups discussed above and illustrated in FIGS. 5A and 5B. The exemplary implementation described in the following paragraphs uses a low-resolution image with elements that are arranged in the same way as the pixel groups shown in FIG. 5A.

The intermediate values may be obtained from the following expression:

$$Q(k, l) = \frac{1}{GX \cdot GY} \sum_{i=k \cdot GX}^{(k+1) \cdot GX - 1} \sum_{j=l \cdot GY}^{(l+1) \cdot GY - 1} \Delta(i, j) \quad (5)$$
$$\text{for } 0 \leq k < K;\ 0 \leq l < L$$

where Q(k, l)=intermediate value in the low-resolution image;
GX=width of differential element groups expressed in numbers of elements;
GY=height of differential element groups expressed in numbers of elements;
K=horizontal resolution of the low-resolution image;
L=vertical resolution of the low-resolution image; and
Δ(i, j)=differential element.

The horizontal size GX of the groups is chosen such that K·GX=RH and the vertical size GY of the groups is chosen such that L·GY=RV where RH and RV are the horizontal and vertical resolutions of the difference image, respectively. For the exemplary implementation discussed above that generates elements in a down-sampled difference image with a resolution of 120×160, one suitable size for the groups is 8×8 pixels, which provides a low-resolution image with a resolution of 120/8×160/8=15×20. By using the lower-resolution intermediate values Q to generate the video signature rather than the higher-resolution differential elements, the generated video signature is less sensitive to processes that change details of video signal content but preserve average intensity.

(2) Video Signature Processor

The implementation of the video signature processor 170 that is described in the following paragraphs generates a video signature from a K×L array of intermediate values Q obtained from either the array of values R shown in FIG. 6A or from a K×L array of differential elements Δ as described above in connection with the processor illustrated in FIG. 5C.

The video signature processor 170 applies a hash function to a K×L array of the intermediate values Q to generate a set of N hash bits. These hash bits constitute the video signature (SV) that identifies the content of the video frames. Preferably, the hash function is relatively insensitive to changes in the intermediate values but may be sensitive to changes in any hash key that may be used. Unlike a typical cryptographic hash function whose output changes significantly with a change to even a single bit of its input, a preferred hash function for this application provides an output that undergoes only small changes for small changes in the input intermediate values. This allows the generated video signature to change only slightly with small changes to video signal content.

One suitable hash function uses a set of N base matrices to generate a set of N hash bits. The base matrices $P_1$ to $P_N$ are K×L arrays of random-valued matrix elements. The matrix elements $p_n(k, l)$ of each base matrix $P_n$ may be generated from the following expression:

$$p_n(k,l) = RGN - \overline{p}_n \text{ for } 1 \leq n \leq N, 0 \leq k \leq K, 0 \leq l < L \quad (6)$$

where $p_n(k, l)$=matrix element (k, l) of base matrix $P_n$;
RNG=output of a random-number generator; and
$\overline{p}_n$=average value of the numbers generated by RNG for each interim matrix.

The generator RNG generates random or pseudo-random values that are uniformly distributed in the range [0,1]. The initial state of the generator may be initialized by a hash key, thereby allowing the hash function and the generated video signature to be more cryptographically secure.

The set of N hash bits is obtained by first projecting the interim values Q onto each of the N base matrices, which may be expressed as:

$$H_n = \sum_{k=0}^{K-1} \sum_{l=0}^{L-1} Q(k, l) \cdot p_n(k, l)$$

for $1 \leq n \leq N$ where $H_n$=the projection of the interim values onto the base matrix $P_n$.

The hash bits are then obtained by comparing each projection to the median value of all projections and setting the hash bit to a first value if the projection is equal to or exceeds the threshold and setting the hash bit to a second value if the projection is less than the threshold. This may be expressed as:

$$B_n = \text{sgn}(H_n - \overline{H}) \quad (7)$$

where $\text{sgn}(x) = \begin{bmatrix} 0 & \text{for } x < 0 \\ 1 & \text{for } x \geq 0 \end{bmatrix}$ and $\overline{H}$=median value of all projections $H_n$.

b) Audio Signature Generator

Figure 7:
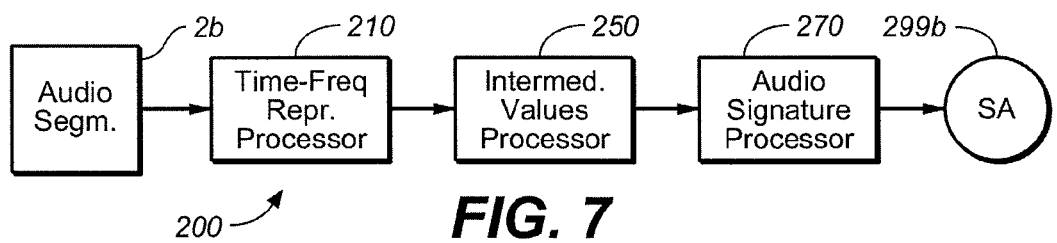
FIG. 7 is a schematic block diagram of one implementation of an audio signature generator.

FIG. 7 is a schematic block diagram of a preferred implementation of an audio signature generator 200. The time-frequency representation processor 210 examines the content of an audio segment 2b within a sequence of segments and generates spectral values representing all or a portion of the spectral components of the audio content in the segment. If the audio content of the segment is represented by values expressing the amplitude of discrete samples, for example, the spectral values may be a set of coefficients within a time-frequency representation generated by a block time-domain to frequency-domain transform. The intermediate values processor 250 examines groups of the spectral values and derives an intermediate value from the intensities of the spectral values in each group. The audio signature processor 270 applies a hash function to the intermediate values to generate an audio signature (SA) 299b that identifies the content of the audio segment.

The components of the audio signature generator 200 may be implemented in a variety of ways. Preferred implementations generate a signature that is relatively insensitive to modifications of audio content that have little or no perceptual effect. If modifications to audio content have no significant effect on the perceived sound, then preferably these modifications also have no significant effect on the generated signature. Some measure of difference between two audio signatures is commensurate with a measure of difference between the two contents from which the signatures are generated. A few suitable implementations are discussed below.

(1) Time-Frequency Representation Processor

In an exemplary implementation in which segments of an audio signal are represented by values expressing the amplitude of discrete samples, the time-frequency representation processor 210 obtains a set of spectral values from transform coefficients generated by applying a time-domain to frequency-domain transform to a sequence of overlapping blocks of audio samples within each segment. If desired, the spectral values may be limited to only a portion of the total bandwidth of the audio content to avoid changes created by any processes that alter the spectral shape of the audio content. For example, a limited representation may be obtained by excluding those transform coefficients generated by the transform that represent the lowest-frequency and highest-frequency spectral components or by bandpass filtering the audio content prior to application of the transform.

Figure 8:
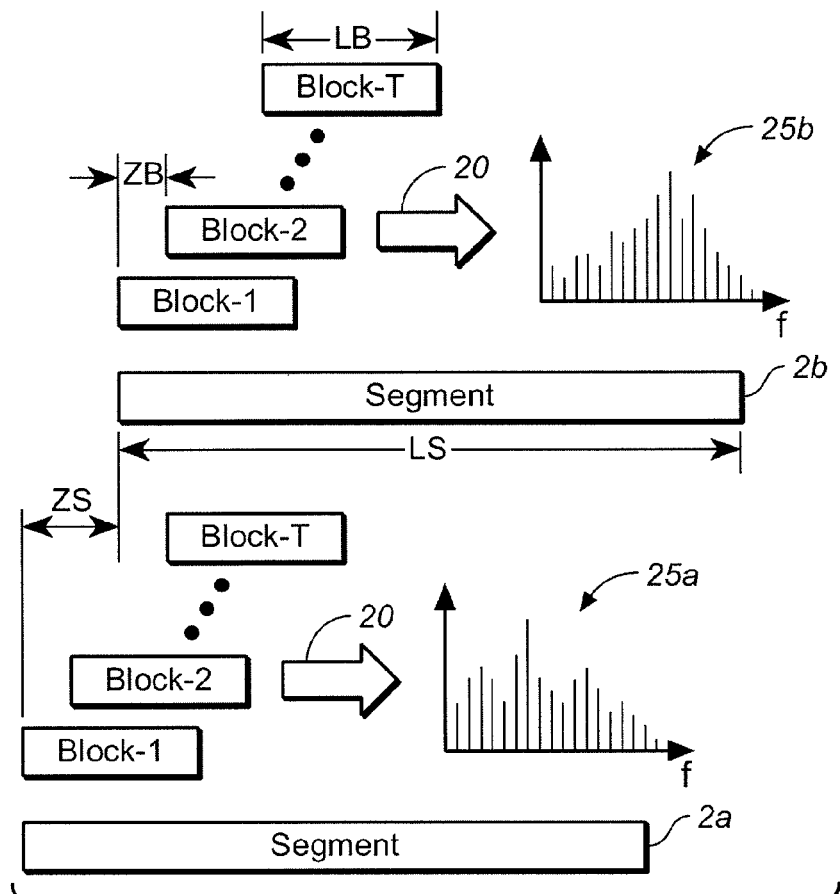
FIG. 8 is a schematic block diagram of a process that may be used to generate a time-frequency representation of a segment of audio content.

The operations performed by an exemplary implementation of the time-frequency representation processor 210 are illustrated schematically in FIG. 8. In this implementation, a segment of audio content 2a is divided into a sequence of T overlapping blocks BLOCK-1 to BLOCK-T. The length of each segment is LS samples and the length of each block is LB samples. The offset between the start of adjacent blocks is a number of samples ZB referred to as the block step size. A block transform is applied to each block of samples to generate a set of spectral values. FIG. 8 illustrates a transformation of one block BLOCK-2 by a transform 20 into a set of spectral values 25a. In this particular implementation, processing continues with the blocks in the next segment 2b after all T blocks in the segment 2a have been transformed into respective sets of spectral values. The offset between the start of adjacent segments is a number of samples ZS that is referred to as the segment step size.

The time resolution of the time-frequency representation is a function of the segment length, block length and block step size, which may be expressed as follows:

$$T = \frac{(LS - LB)}{ZB} \quad (8)$$

where T=time resolution or number of blocks in each segment;
LS=length of each segment in samples;
LS=length of each block in samples; and
ZB=block step size.

The frequency resolution is generally determined by the length of the block or the length of the transform that is used to generate the spectral values.

In one application discussed below that synchronizes video and audio content, audio content is divided into segments that are equal to the length of three video frames. For some television applications, the time interval spanned by three video frames is approximately 100 msec. If the audio sample rate is 48 kHz, then the audio segment length is 4,800 samples. The block length is chosen to be 256 samples and the block step size is chosen to be 32 samples. For this implementation, each audio segment has T=142 blocks; therefore, the time resolution of the time-frequency representation is equal to 142. A 256-point Fast Fourier Transform (FFT) is applied to each block of samples to generate 129 spectral values; therefore, the frequency resolution of the time-frequency representation is equal to 129. The segment step size is chosen to be 512 samples or approximately 10.7 msec.

(2) Intermediate Values Processor

The intermediate values processor 250 examines groups of the spectral values and derives an intermediate value from the intensities of the spectral values in each group.

Figure 9:
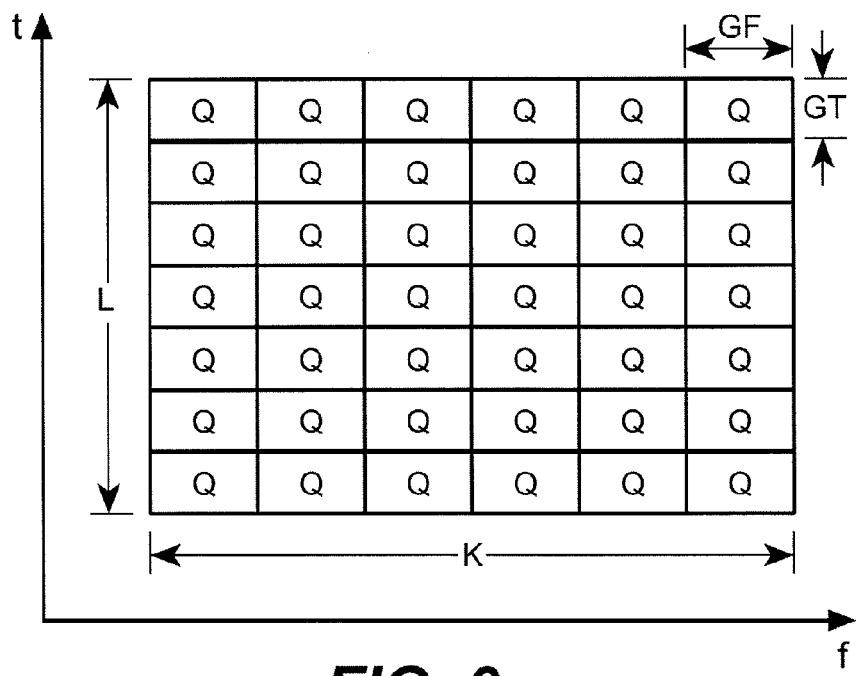
FIG. 9 is a schematic block diagram of a set of intermediate values in a low-resolution time-frequency representation.

In an exemplary implementation, the spectral values S are grouped into time-frequency regions where each region is GF spectral values wide and GT blocks long. Intermediate values Q are derived from the intensities of the spectral values by calculating the average intensity of the spectral values in each region. These intermediate values constitute a low-resolution time-frequency representation that has a resolution of K×L intermediate values. This is illustrated schematically in FIG. 9. The intermediate values may be obtained from the following expression:

$$Q(k, l) = \frac{1}{GF \cdot GT} \sum_{i=k \cdot GF}^{(k+1) \cdot GF - 1} \sum_{j=l \cdot GT}^{(l+1) \cdot GT - 1} S(i, j) \quad (9)$$

for $0 \le k < K; 0 \le l < L$ where Q(k, l)=intermediate value in the low-resolution representation;
GF=width of spectral value groups expressed in numbers of values;
GT=length of spectral value groups expressed in numbers of blocks;
K=frequency resolution of the low-resolution representation;
L=time resolution of the low-resolution representation; and
S(i, j)=spectral values.

The size GF of the groups is chosen such that K·GF=RT and the size GT of the groups is chosen such that L·GT=RT where RF and RT are the frequency and time resolutions of the low-resolution representation, respectively. For the exemplary implementation discussed above and below, one suitable size for the groups is GF=6 and GT=14, which provides a low-resolution representation of 129/6×142/14≈20×10 intermediate values. By using the lower-resolution intermediate values Q to generate the audio signature rather than the higher-resolution time-frequency representation, the generated audio signature is less sensitive to processes that change details of spectral content but preserve average spectral levels.

The operations that calculate the time-frequency representation and the intermediate values may be performed in other ways. For example, a set of spectral values with a lower-frequency resolution may be obtained by decreasing the block length and transform length and increasing the length GT of the spectral value groups to obtain the same time resolution. If desired, the width GF of the groups can be varied across the spectrum. If high-frequency spectral components are deemed to be less significant than lower-frequency components for the generated signature, this relative significance can be realized by increasing the width of the groups for the higher frequencies.

(3) Audio Signature Processor

The audio signature processor 270 applies a hash function to a K×L array of the intermediate values Q to generate a set of N hash bits. These hash bits constitute the audio signature (SA) that identifies the content of the audio segments. This may be done in the same way that is described above for the video signature.

2. Relative Temporal Alignment

The synchronization signature construct also conveys the relative temporal alignment of the video and audio signals that correspond to the video and audio signatures. If the video and audio signals are synchronized when the video and audio signatures are generated, the relative temporal alignment of these signals can be conveyed implicitly by associating the corresponding video and audio signatures in some data construct or signal. The relative temporal alignment can also be conveyed explicitly. For example, a value may be included in the synchronization signature construct that expresses the amount by which the audio signal was leading or lagging the video signal when features were extracted to generate the video and audio signatures.

A synchronization signature construct may be generated at any rate that may be desired. Three methods are discussed below. The first method generates signatures at a fixed rate. The second method generates signatures at a variable rate in response to the detection of one or more events. The third method is a hybrid of the first and second methods.

a) Fixed Rate

The first method extracts features and generates synchronization signature constructs at a fixed rate. The signatures may be assembled into blocks that can be transmitted at a fixed rate. If the choice of features is adapted, it is possible that a block may convey no signature because no features were extracted or it may convey one or more signatures derived from one or more features.

The temporal resolution of a signature may be implicit or the block may include an explicit indication of the resolution. If a signature is generated from features extracted from content that spans a particular time interval, then the temporal resolution of the signature is equal to that time interval. This resolution can be conveyed implicitly by any information that identifies the time interval. For example, if a video signature is generated from features that are extracted from each frame in a sequence of video frames, then the temporal resolution of the video signature is equal to the interval between adjacent frames. This resolution can be conveyed by any information that identifies the frame rate. If an audio signature is generated from audio features that are extracted from audio content associated with each video frame, then the temporal resolutions of the video and audio signatures are the same. If a higher temporal resolution is desired, the relative time of the extracted features within the time interval may be captured and passed with the signature.

For this method, the temporal relationship between video and audio features is implied by the structure and temporal relationship of the frames of video content and the blocks of audio content. If signatures are generated from a large number of features that occur often, this fixed-rate method may be preferred. The way in which the relative temporal relationship between video and audio signals is conveyed can be determined from the features and frame/block lengths used as well as the level of desired temporal resolution. If frame and block lengths or rates are not fixed and cannot be known implicitly, then the synchronization signature construct or some related data structure could include some information that specifies these lengths or rates.

b) Event Driven

The second method extracts features and generates signatures in response to the occurrence of some event such as large changes in the overall image like a scene change or program boundary, or abrupt changes in audio features like transients or segments of speech. For this method, the synchronization signature construct should include some timing information for the features that are used to generate a signature. This information may specify absolute times, relative times or time intervals between events. For example, if a video signature is generated from video features extracted at some time $t_0$ and an audio signature is generated from audio features that are extracted at time $t_0+15$ msec., then the synchronization signature construct that contains these video and audio signatures or some related data structure could include some indication that specifies the 15 msec. offset. If signatures are generated from only a few features that occur relatively infrequently, then this method may be preferred. The temporal resolution of the synchronization signature construct is limited by the resolution of the extracted features and the resolution of the timing information.

c) Hybrid

The third method is a hybrid of the fixed-rate and the event-driven methods described above. According to this method, signatures are generated at a fixed rate but each signature contains information that specifies with higher resolution the time of features used to generate the signature. For example, suppose video content is arranged in a sequence of frames and the associated audio is arranged in a sequence of blocks, where each block is aligned with and associated with a respective frame. In this example, video features are extracted once for each video frame and audio features are extracted once for each audio block. The time intervals between adjacent frames and blocks are known; therefore, no explicit timing information is required; however, a higher temporal resolution for the audio features may be desired if an event triggers the extraction of a particular audio features from only part of the block. This can be done, for example, by including information in the synchronization signature construct that specifies the time offset of the audio feature within the block. This hybrid approach allows some features to be extracted at a low fixed rate and other features to be extracted in response to some event.

C. Signature Distribution

Figure 10:
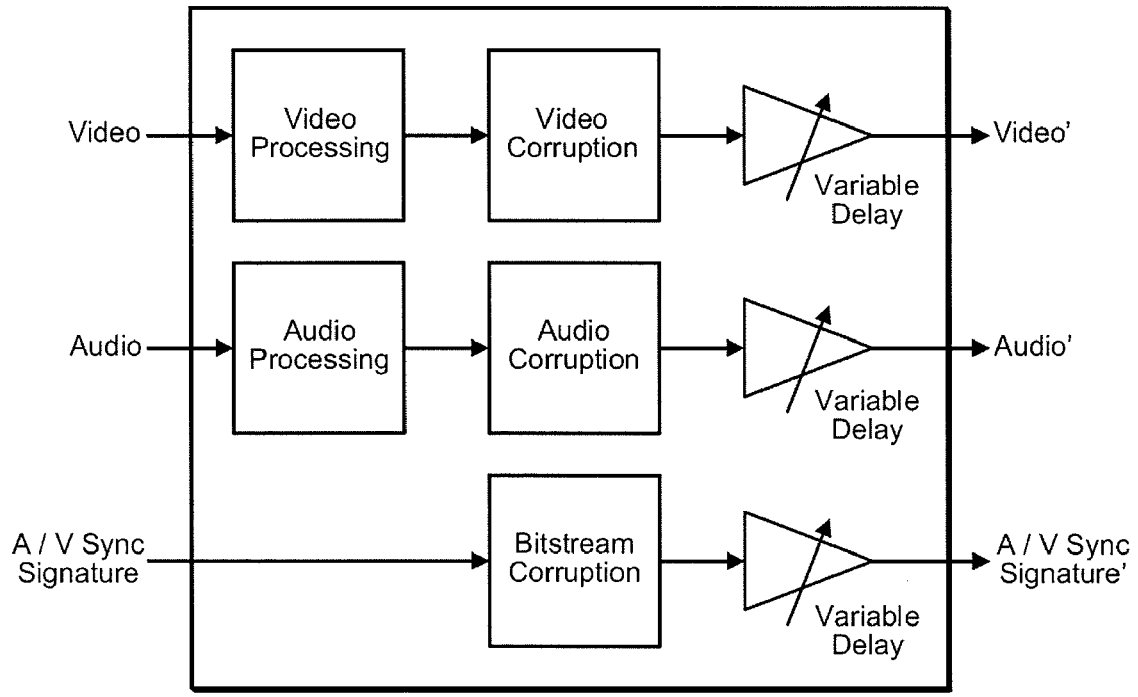
FIG. 10 is a schematic block diagram of an exemplary distribution network for video and audio signals and a synchronization signature construct.

FIG. 10 is a schematic block diagram of an exemplary distribution network comprising paths in which video and audio signals are modified and video content, audio content and the synchronization signature construct are delayed. This network applies to the real-time and non-real-time systems described above. In alternative implementations of the network, two or more of the signals are processed and conveyed in the same path. Video content, audio content and the synchronization signature constructs may be distributed in essentially any way that may be desired. For example, video and audio content and the synchronization signature constructs may be assembled into one data stream and distributed together, various combinations may be assembled to form two streams and each of the stream is distributed independently, or all may be distributed independently of one another.

As shown in the figure, video and audio content and the synchronization signature construct may be subjected to corruption or modifications that are unintentional. An example of an unintentional modification is the insertion or addition of noise in transmission channels and on storage media.

Video and audio content may also be subjected to modifications that are intentional. Examples of intentional modifications to video signals include luminance and color modifications such as contrast/brightness adjustments, gamma correction, luminance histogram equalization, color saturation adjustments and color correction for white balancing; they include geometric modifications such as image cropping and resizing, image rotation and flipping, resolution scaling, frame rate conversion, stretching, speck removal, blurring, sharpening and edge enhancement; and they include content processing such as lossy compression, chroma-keying and the insertion of logos. Examples of intentional modifications to audio signals include amplification, equalization, dynamic range modification, sample-rate conversion, channel up-mixing, channel down-mixing, time-scale modification, bandwidth reduction, pitch shifting, voice-over and other types of mixing, insertion of reverberation, spectral shaping and lossy data compression.

The delay elements shown in the figure represent the time needed to perform processes such as signal encoding and formatting, content store and forwarding, and transmission. These delays can be very significant in real-time systems because they increase the demands that are placed on the facilities used to restore synchronization. The difference in delay of distribution for any two of these signals increases the amount of storage or buffering that is needed to store information. For real-time systems, it is generally important to deliver the synchronization signature construct ahead of, concurrent with, or shortly after the corresponding video and audio content are delivered to reduce the amounts of buffer space needed to store the video and audio content, and to reduce the delay on the final delivery of the content.

A delay in the distribution of the synchronization signature construct can be significant even for non-real-time systems. In some implementations, the synchronization signature construct for an entire stream of video-audio content must be received before application processing can start.

No particular characteristics or structures of the distribution network are critical to the present invention in principle but they may have consequences on practical implementations.

The characteristics of the communication paths and the processing paths in the distribution network can affect how the video and audio signatures are generated and how the synchronization signature construct is distributed. Restrictions on path bandwidth may affect which features and how many features are used to generate the video and audio signatures because the choice and number of features can affect the amount of data, or the number of bits, needed to represent the signatures.

The structure of the distribution network can impose restrictions on the structure of the synchronization signature construct. Conversely, any requirements of an application that are imposed on the structure of the synchronization signature construct can impose restrictions on the structure of the distribution network. In principle, the synchronization signature construct may be combined with the video signal, combined with the audio signal, combined with some other signal or distributed separately in its own signal.

In real-time systems, for example, the synchronization signature construct may be combined with the video signal and carried with its vertical ancillary (VANC) data; this may require the signature to be structured for frame-based packets. Alternatively, the synchronization signature construct may be combined with the video signal by steganographic or watermarking techniques, which may significantly restrict the amount of data that can be used to represent the signature.

In non-real-time or file-based system, for example, the synchronization signature construct may be embedded into a file with video content or audio content, embedded in a file with some other type of content, or placed into its own file.

D. Signature Detection

The synchronization signature construct discussed above may be used in a variety of applications such as the correction of synchronization between video and audio signals as described above. Exemplary implementations for some of these applications are described below.

1. Synchronization a) Overview

Figure 11:
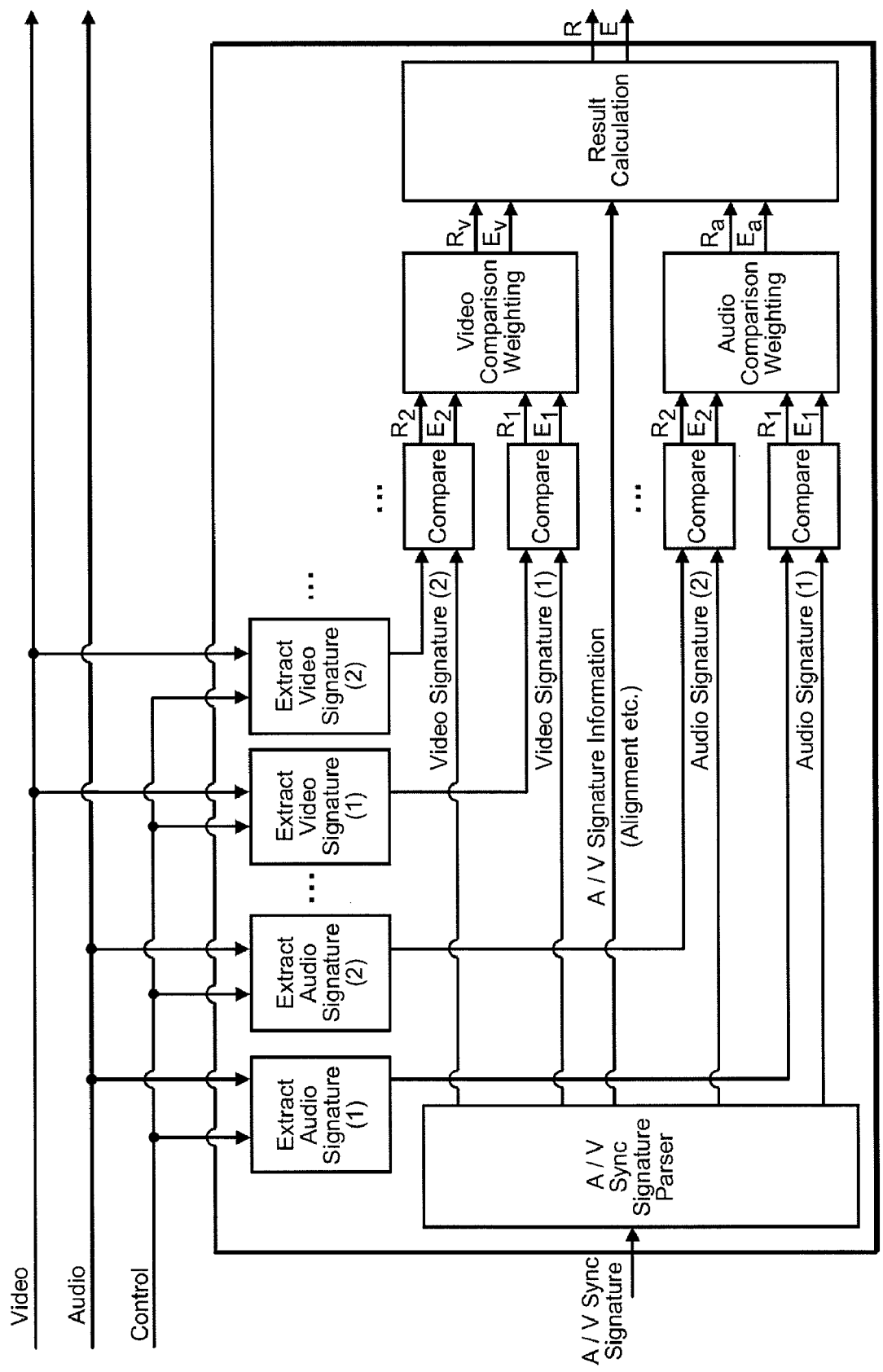
FIG. 11 is a schematic block diagram of an exemplary device that uses synchronization signature constructs to detect synchronization of video and audio signals.

The device illustrated in FIG. 11 corresponds to the A/V Sync Detector shown in FIGS. 1 and 2. It may be used to detect and correct synchronization between destination video content and destination audio content that it receives from some real-time or non-real-time source as shown in FIGS. 1 and 2.

Referring to FIG. 11, a Signature Parser in the A/V Sync Detector receives and parses a synchronization signature construct to obtain one or more reference video signatures representing one or more video features of the reference video signal, one or more reference audio signatures representing one or more audio features of the reference audio signal, and an indication of the relative temporal alignment of these video and audio features. The relative temporal alignment may be conveyed either implicitly or explicitly by the synchronization signature construct.

The A/V Sync Detector illustrated in FIG. 11 generates one or more destination video signatures and one or more destination audio signatures by analyzing the destination content to extract all or a subset of the video and audio features that were extracted from the reference content to generate the synchronization signature construct. The processes used to generate the destination signatures are generally the same as or a subset of those processes used to generate the reference signatures. The destination video signatures are generated in response to one or more of the video features that are extracted from the destination video content. The destination audio signatures are generated in response to one or more of the audio features that are extracted from the destination audio content.

In one implementation, the Compare components in the A/V Sync Detector compare the destination signatures for a range of destination content with the reference signatures for a range of reference content in a search to find exact or close matches. Destination video signatures are compared with reference video signatures and destination audio signatures are compared with reference audio signatures. If desired, a sequence of reference signatures can be compared to a sequence of destination signatures in a search to find high degrees of correlation between sequences. The purpose of the comparisons is to identify destination video and destination audio content that corresponds to the reference video content and reference audio content used to generate the reference signatures. The temporal alignment of the corresponding destination video and destination audio content can then be compared to the indication of relative temporal alignment obtained from the synchronization signature construct. Any difference in relative alignment represents an error in synchronization.

There may be some uncertainty in the correctness of the matches determined by the Compare components because the destination signatures are not identical to the corresponding reference signatures if less than all features are extracted or if the destination content differs with the reference content. Uncertainty may also arise for some content such as video or audio content that is stationary for long periods of time. If the A/V Sync Detector is implemented by very limited computational resources such as that in a mobile phone, for example, it may be desirable to generate the destination signatures using only a subset of the features that were used to generate the reference signatures. If multiple features are used to generate the reference signatures, the use of only a subset of these features represents a tradeoff between the reliability of the comparisons and the implementation complexity. Proper design of the system will tend to keep the differences between the signatures small enough to permit the comparisons to be performed reliably. The Compare components can calculate measures of "match confidence" that represent the degree of certainty in a match. Techniques for calculating these measures are described below.

The comparison performed by the Compare components provides the information needed by the Result Calculation to derive an indication of synchronization error and a measure of reliability in the calculated synchronization error. This measure of reliability can be derived from the measures of match confidence determined by the Compare functions.

If desired, the synchronization error can be determined using one or more types of signatures for the destination content. The signature types for the destination content can be selected in a manner similar to that discussed above for generation of signatures for the reference content. For example, video signatures may be selected on the basis of whether considerable motion is present in the destination video content and audio signatures may be selected on the basis of whether speech is in the destination audio content. The types of signatures that are generated for the destination content should be the same as, or at least comparable to, the types of signatures that are conveyed in the synchronization signature construct.

If the intended application only detects misalignment or confirms synchronization, the A/V Sync Detector illustrated in FIG. 11 can present the calculated synchronization error and the associated measure of reliability on a display or a meter of some type. If the intended application restores synchronization, the calculated synchronization error and the associated measure of reliability are used to control Variable Delay components in an A/V Sync Corrector. These delays are applied to the video signal, the audio signal, or both, as illustrated in FIGS. 1 and 2. For example, if the calculated synchronization error indicates the destination audio content precedes the destination video content by 700 msec., proper synchronization can be achieved by delaying the audio signal by 700 msec. or by delaying the video content by x msec. and delaying the audio signal by 700+x msec.

Devices and systems that incorporate various aspects of the present invention are able to detect and correct synchronization errors that changes throughout the course of the video and audio content.

In a real-time system, the A/V Sync Detector can continually extract features from the destination content and generate destination signatures in real time. The A/V Sync Detector can maintain a historical set of reference and destination signatures to perform comparisons for an interval of content that can span several seconds or longer. When the current synchronization error has been calculated with a sufficient level of reliability, the variable delays in the A/V Sync Corrector signals can be adjusted to restore synchronization. The rate at which the variable delays are changed to compensate for changes in misalignment of the destination content can be controlled as desired to improve or maintain the perceived quality of the video-audio presentation.

If the synchronization signature construct arrives later than the video and audio content in a real-time system, the time needed to restore synchronization may be increased to unacceptable levels unless the destination content can be buffered long enough before being processed by the A/V Sync Corrector. This problem may not exist in non-real-time and file-based systems. A file-based system, for example, may have access to the entire content and all synchronization signature constructs. The amount of the synchronization error can be calculated after analyzing the entire content. A single value for the error may be calculated, or several values may be calculated for different segments of the content.

b) Calculation of Alignment Error

One way to calculate the temporal misalignment between video and audio content is described in the following paragraphs.

Suppose a stream of destination video content is received through a signal processing path that imposes a processing delay denoted by the symbol $\delta_V$. Suppose further that a stream of destination audio content is received through a signal processing path that imposes a processing delay denoted by the symbol $\delta_A$. One more Compare components in the A/V Sync Detector compare the reference video signatures $SV_{REF}$ and the destination video signatures $SV_{DEST}$ and these Compare components, with the Video Comparison Weighting component if present, generate an estimate $\epsilon_V$ of the video processing delay. The relative timing difference between the reference and destination video streams can be obtained from the estimated delay $\epsilon_V$. One more Compare components in the A/V Sync Detector compare the reference audio signatures $SA_{REF}$ and the destination audio signatures $SV_{DEST}$ and these Compare components, with the Audio Comparison Weighting component if present, generate an estimate $\epsilon_A$ of the audio processing delay. The relative timing difference between the reference and destination audio streams can be obtained from the estimated delay $\epsilon_A$.

One technique that may be used to estimate the processing delay is described in the following paragraphs. No distinction is made between video and audio because the video processing delay estimate $\epsilon_V$ and the audio processing delay estimate $\epsilon_A$ can be calculated in the same manner.

The content delay calculation receives two sets of signatures. One set is a sequence of reference signatures denoted $\{S_{REF}(i)\}$ and the second set is a sequence of destination signatures denoted $\{S_{DEST}(i)\}$. A correlator searches over ranges of the two sequences to find a window in which the sets of signatures have the highest degree of correlation. This may be done by first computing the following scores:

$$D(m, i) = \sum_{j=0}^{W-1} HD[S_{REF}(i+j), S_{CURR}(m+j)] \quad (10)$$

$$\text{for } 1 \le i \le F, i - U \le m \le i + U$$

where D(m, i)=calculated score for a particular alignment between streams;
HD[r,c]=Hamming distance between signatures r and c;
F=number of signatures in the set of reference signatures $\{S_{REF}(i)\}$;
U=the search range for the correlator; and
W=length of correlation window expressed as a number of signatures.
The Hamming distance is equal to the number of bit positions in which two signatures differ.

The estimated processing delay may be derived from the value of m where the closest match between reference and destination signatures within the correlation window is found. This can be expressed as:

$$\varepsilon_i = \underset{m}{\mathrm{argmin}}[D(m, i)] \quad (11)$$

for $i - U \le m \le i + U$

If there is no processing delay, then $\epsilon_i = i$. If the estimated delay is three frames or three segments, then $\epsilon_i = i+3$. The relative timing difference for the frame or segment that corresponds to the signature $S_{REF}(i)$ is the offset between $\epsilon_j$ and i. The relative timing difference for video frame i is denoted herein as dv(i) and the relative timing difference for audio segment i is denoted herein as da(i).

In one implementation for television, the values W=10 and U=45 are used for video frames and the values W=23 and U=47 are used for audio segments. The values for F used in the video and audio delay calculations are the numbers of video frames and audio segments, respectively, in the reference streams.

Figure 12:
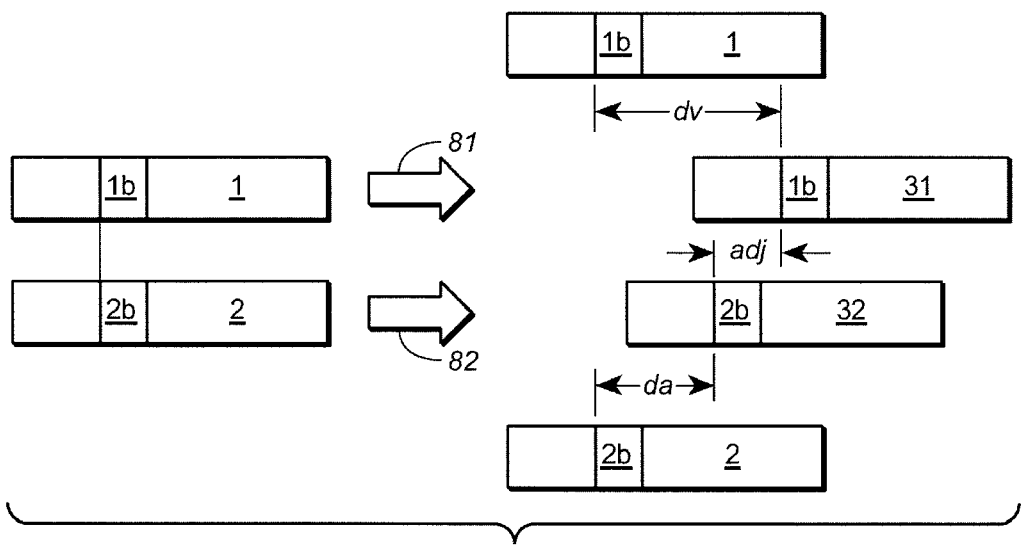
FIG. 12 is a schematic block diagram illustrating timing delays in video/audio streams.

The calculation of the relative delay between video and audio uses the relative timing differences for the video and audio streams to calculate an amount of delay for either or both destination streams to achieve proper synchronization. This is illustrated schematically in FIG. 12. The reference video frame 1b in a reference video stream 1 and the reference audio segment 2b in a reference audio stream 2 are shown in synchronization. Signal processing 81 for the video stream 1 and signal processing 82 for the audio stream 2 introduce different delays into the two streams. As a result, the destination video frame 1b in the destination video stream 31 and the destination audio segment 2b in the destination audio stream 32 are no longer in synchronization. The destination video frame 1b has been delayed by dv and the destination audio segment 2b has been delayed by da. The adjustment to delay adj that is needed to restore synchronization is equal to (dv−da). If dv is greater than da as shown in the figure, then synchronization may be restored by delaying the audio segment by the adjustment adj. If dv is less than da then synchronization may be restored by delaying the video frame by the adjustment adj. The streams can be delayed in essentially any way that may be desired but one way is to store and retrieve stream content in a first-in first-out (FIFO) buffer that has sufficient capacity to provide the adjustment to the delay.

c) Calculation of Measures of Confidence

A measure of match confidence can be calculated in a variety of ways. A few techniques are described in the following paragraphs.

(1) Prediction Model

One technique for calculating a measure of match confidence uses a prediction model to predict an alignment error and calculates a measure of match confidence from how closely a calculated alignment error agrees with the predicted error.

Figure 13:
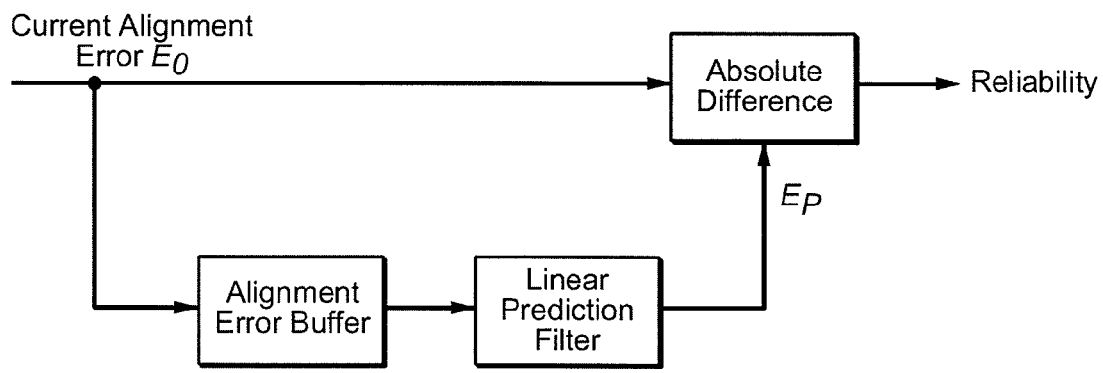
FIG. 13 is a schematic block diagram of an exemplary technique that uses a prediction model to calculate a measure of match confidence.

FIG. 13 is a schematic block diagram of an exemplary technique that uses a prediction model to calculate a measure of match confidence. According to this technique, a sequence of the most recent calculated alignment error $E_0$ and several prior calculated alignment errors $E_1, E_2, \ldots, E_N$ are stored in a buffer. A linear prediction filter is applied to the stored sequence of calculated alignment errors to derive a predicted alignment error $E_P$. A measure of match confidence $R_P$ is calculated from an absolute difference between the predicted alignment error and the most recent calculated alignment error. One way this measure can be calculated is shown in the following expression:

$$R_P = \frac{E_{MAX} - |E_0 - E_P|}{E_{MAX}}$$

where $E_{MAX}$=a maximum expected difference with the predicted error. This measure of match confidence equals one when the predicted alignment error and the calculated alignment error are equal. The measure decreases to zero as the difference between the predicted misalignment $E_P$ and the most recent calculated misalignment $E_0$ approaches the maximum expected difference $E_{MAX}$, and it is negative if the difference exceeds the maximum expected difference.

The use of a linear prediction model is based on an assumption that synchronization errors will either be constant or will change linearly over time. If a synchronization error has been constant for a period of time, it likely that the error will remain constant. If instead the synchronization error has increased or decreased for a period of time, it is likely the error will continue to change at the same rate. A calculated error in alignment is considered to be more reliable if it agrees closely with the predicted error.

When a calculated error deviates significantly from the predicted error, it is likely the deviation is caused by either a random error or by an actual change in synchronization such as that caused by a splice in content. At this point of deviation, the measure of match confidence is very low. If the deviation is due to a random error, the calculated alignment error is likely to be incorrect and it can be ignored. If the deviation is due to an actual change in alignment, however, the calculated error may be correct but it is still deemed to be unreliable. This situation will be corrected as the calculated alignment error returns to be constant or linearly changing. The measure of confidence obtained in this manner may be low-pass filtered to remove or mitigate the effects of random errors.

A prediction model may be applied to alignment errors that are calculated for video content and audio content independently or jointly. If alignment errors are calculated for video and audio content independently and these two errors increase at the same rate, this condition is essentially the same as an alignment error calculated jointly for video and audio content that remains constant.

(2) Statistical Model

Another technique for calculating a measure of match confidence uses a statistical model to determine the probability of a calculated alignment error. This model can be based on theoretical or empirical determined statistics of alignment errors. If the statistical model indicates a calculated alignment error is more likely, the measure of confidence for that calculated error is higher.

One simple statistical model is based on empirical data that indicates alignment errors are typically only a few milliseconds rather than hundreds of milliseconds. According to this mode, small alignment errors are more likely than very large alignment errors. Measures of confidence obtained from this model can be used to exclude outliers or extremely large errors from subsequent processing.

(3) Signal-Content Model

Another technique for calculating a measure of match confidence uses a signal-content model to determine the probability of a calculated alignment error. This type of model may be applied to the content itself, to the features extracted from the content that are used to generate signatures, or to the signatures themselves.

One signal-content model is an activity detector that determines the stationarity of the video and audio content. If video or audio content remains unchanged for hundreds of milliseconds, for example, the content conveys little activity and the measure of match confidence for this content would be small.

Another signal-content model analyzes the content to determine if certain characteristics are present. For example, video content may convey considerable activity such as changes in background details but lack significant motion in foreground objects. The activity detector mentioned above might indicate considerable activity from the changes in background details but the lack of motion would make matches are more difficult. The measure of match confidence could be set to a low value if little or no motion is present. As another example, accurate matches may be more likely if speech is present in the audio content. The measure of match confidence could be set to a high value if speech is detected.

(4) Attack-Prediction Model

Another technique for calculating a measure of match confidence uses a model to predict the likelihood of a correct match with content that has been modified or "attacked" by different processes after the reference signatures were generated. Signatures based on certain features may be more or less sensitive to various types of modifications. The attack-prediction model attempts to determine what types of content modifications have occurred. This may be done by analyzing differences between reference and destination content if both content are available, or by analyzing differences between reference and destination signatures. Examples of video content modification include cropping, changes in spatial resolution, changes in frame rate, image reversal, and perceptual coding. Examples of audio content modification include bandwidth reduction, changes in sample rate, and perceptual coding.

With this determination, measures of confidence in a match based on a particular signature type can be derived from the level of resistance that signature type has against the content modifications that have occurred. If a particular signature type is insensitive to certain types of content modification and only those types of modification are deemed to have occurred, the measure of confidence in a match based on this signature type is set to a higher value. On the other hand, if a particular signature type is sensitive to certain types of content modification and those types of modification are deemed to have occurred, the measure of confidence in a match based on this signature type is set to a lower value.

(5) Operator Input

Another technique for calculating a measure of match confidence uses operator input. Operator input can directly specify a measure of confidence or it can provide input to one of the models discussed above. For example, operator input can identify content characteristics such as the presence or absence of motion in vide content or the presence or absence of speech in audio content, or it can specify the types of signal modifications or attacks that have occurred since reference signature generation. Other types of input are possible.

(6) Transmission Errors

Another technique for calculating a measure of match confidence is based on the detection of transmission errors. If uncorrectable transmission errors are known to exist in the destination content or in the synchronization signature construct, matches based on this data are likely to be less reliable than matches based on data that does not have these errors. Measures of match confidence can be set to lower values when transmission errors are known to have occurred. The measures can be set to even lower values if larger numbers of uncorrectable errors have occurred. It should be noted, however, that the absence of transmission errors by itself does not imply measures of match confidence should be high. The detection of transmission errors can be used to set a ceiling on the value of measures that are calculated from other methods such as those described above.

d) Using Measures of Confidence

The measures of match confidence can be used to implement one or more types of processes or filters for use in calculating the synchronization error and its associated measure of reliability.

The measures of match confidence may be used in a variety of processes that exclude or minimize the effects of short-term deviations in the calculated synchronization error. One exemplary process uses three types of models of past synchronization errors. The Type 1 model represents a sequence of errors that are constant. The Type 2 model represents a sequence of errors that increase or decrease at a linear rate. The Type 3 model represents a sequence of errors that include an abrupt jump or change in value. The exemplary process analyzes an interval of past synchronization errors and selects which of the three model types best represents this sequence. Parameters for the selected model are derived to minimize differences between the selected model's output and the past error values. The choice of model type and its parameters is stored in a buffer. Preferably, the prediction model technique discussed above is used to calculate a measure of match confidence in the selected model and the selected model type is stored in the buffer with its associated measure of match confidence only if that measure of confidence is greater than a threshold. If desired, an additional filter may be used to exclude selected models from the buffer that generate outlier error values. The buffer of stored models may be used to predict the current synchronization error for intervals where measures of match confidence are below a threshold. This may be done in a variety of ways. A few ways are mentioned here.

One way uses the stored model with the highest measure of match confidence to estimate the current synchronization error. A second way calculates an average of the model parameters for the stored models, derives a new model from the averaged parameters and uses this new derived model to estimate the current synchronization error. A third way identifies which of the three model types is stored most often in the buffer and uses this model type to estimate the current synchronization error.

If desired, the output of a Type 2 model can be subjected to further checks by calculating a prediction error between the model output and the most recent synchronization error. The model is deemed to be reliable and its output is used only if the prediction error is below a threshold. If the prediction error is above the threshold, the model is deemed to be unreliable, and the most recent reliable model stored in the buffer is used to estimate the current synchronization error.

One type of filter calculates weighted sums of individual calculated alignment errors. If multiple signatures are used, an alignment error is calculated for each signature and a single synchronization error is obtained from the individual calculated alignment errors. For example, if three different signatures are available for comparison, a respective alignment error $E_1$, $E_2$ and $E_3$ can be determined for each signature and a respective measure of match confidence $R_1$, $R_2$ and $R_3$ is calculated for each alignment error. The synchronization error E is obtained from a sum of the calculated alignment errors that are weighted according to the corresponding measures of match confidence. This sum can be expressed as:

$$E = \frac{R_1 \cdot E_1 + R_2 \cdot E_2 + R_3 \cdot E_3}{R_1 + R_2 + R_3}$$

Another type of filter selects the calculated alignment error that has the highest measure of match confidence and sets the synchronization error equal to this alignment error.

Another type of filter excludes alignment errors from calculation in the filters described above if the associated measure of match confidence is below some threshold.

A gating filter may be implemented in cascade with the other filter types described above. This gating filter generates a binary-valued output signal that indicates whether the calculated measure of reliability for the synchronization error is greater than a threshold. This signal may be used to control subsequent processing. For example, an A/V Sync Corrector may inhibit the correction of synchronization errors if the output of this filter indicates the calculated synchronization error is not reliable.

If multiple signatures are used to calculate the synchronization error, different methods may be used to obtain the measure of reliability for that calculated error from the measures of match confidence for the individual alignment errors. For example, the overall measure of reliability may be set equal to the maximum, the minimum, the mean or the median value of the individual measures of match confidence.

2. Other Applications

The synchronization signature construct may be used in a number of other applications.

One application preserves the synchronization of ancillary information. Because the reference video and reference audio signatures in a synchronization signature construct are based on features that have a known temporal relationship with video and audio signals, these reference signatures can be used to synchronize ancillary information to either or both of the video and audio signals. This ancillary information includes essentially any type of data that conveys time-sensitive information associated with the video-audio content. A few examples include closed captioning information, time codes such as those described in SMPTE standard 12M, and device control signals. This application can be achieved by binding this ancillary information with the synchronization signature construct in some manner such as including it in the signature, interleaving it with the synchronization signature construct, or by assembling the synchronization signature construct with the ancillary information in some larger data construct.

Another application identifies video-audio content. Because the reference video and reference audio signatures in synchronization signature constructs are based on features that are extracted from video-audio content, it is likely that a sequence of these reference signatures is unique for a given video-audio program. This means the reference video and reference audio signatures in a synchronization signature construct can be used to identify content. In one implementation of this application, a sequence of destination signatures is generated from destination content and this sequence of destination signatures is compared against a database of sequences of reference signatures. If a sequence of reference signatures is found that matches the sequence of destination signatures, which means the sequence of destination signatures is deemed to be sufficiently similar to the particular sequence of reference signatures, then the destination content is identified as a copy of the content that corresponds to the particular sequence of reference signatures. Video and audio content can be searched together or independently. Furthermore, it is likely the content can be identified accurately even if it has been subjected to a variety of processes that modified it, as discussed above.

Figure 14:
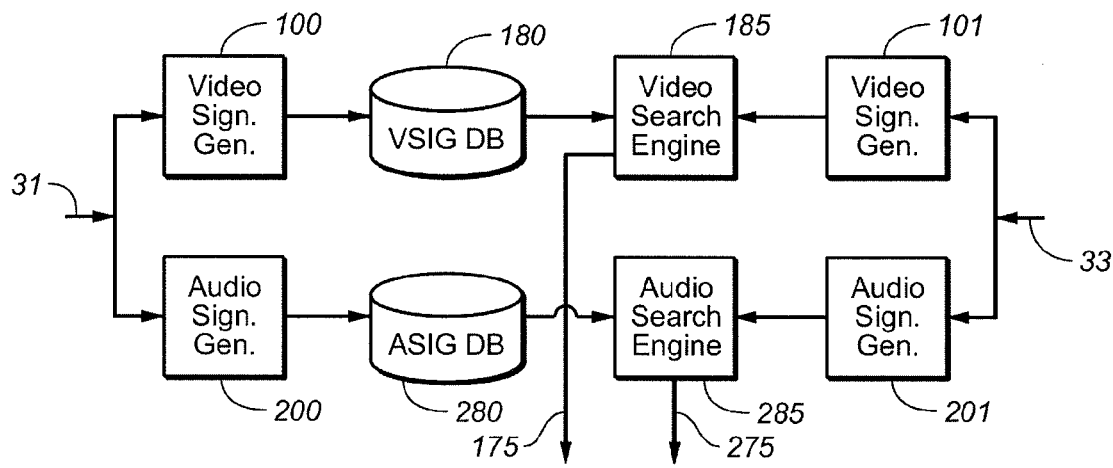
FIG. 14 is a schematic block diagram of a device that manages a signature database for detection of copies of video or audio content.

FIG. 14 is a schematic block diagram of a system that may be used to identify content. The video signature generator 100 and the audio signature generator 200 generate reference video signatures and reference audio signatures from reference video/audio streams of content received from the path 31. The generated reference video signatures are stored in the video-signature database (VSIG DB) 180 and the generated reference audio signatures are stored in the audio-signature database (ASIG DB) 280. The reference signatures may be stored with other information that may facilitate implementation of the application. For example, the reference signatures may be stored with the underlying content itself or with data that identifies information about the content such as the content owner, content licensing terms, title of the content or a textual description of the content. Each reference signature has a database search key. This key may be derived in any manner that may be desired. Preferably, the key is based on or derived from the reference signature itself.

The identity of any specified video content or audio content may be checked against reference content represented by information stored in the video and audio databases. The content whose identity is to be checked is referred to herein as the test content. The identity of the test video content may be checked by having the video signature generator 101 generate test video signatures from the test video content received from the path 33 and passing the test video signatures to the video search engine 185. The video search engine 185 attempts to find reference video signatures in the video-signature database 180 that are an exact or close match to the test video signatures. The identity of the test audio content may be checked by having the audio signature generator 201 generate test audio signatures from the test audio content received from the path 33 and passing the test audio signatures to the audio search engine 285. The audio search engine 285 attempts to find reference audio signatures in the audio-signature database 280 that are exact or close match to the test audio signatures.

In one implementation, the search engines calculate the Hamming distances between the test signatures and the reference signatures stored in the databases and searches for a sequence of reference signatures that are closest to a sequence of the test video signatures. The calculations shown above in expressions 10 and 11 or some variation of them may be used to conduct the search. If the distance between two sequences of signatures is less than some threshold, the test content associated with the sequence of test signatures is deemed to be an exact or modified copy of the reference content that is associated with the sequence of matching reference signatures. Empirical results suggest that good results can be obtained for a variety of video and audio content using sequences of signatures that represent about two seconds of content.

Yet another application is content verification and quality monitoring. A high degree of correlation between reference signatures and the destination signatures generated from destination content indicates the destination content is identical to or at least substantially the same as the reference content. A low degree of correlation indicates there are substantial differences between destination and reference content. These differences may be due to the fact the content is different or due to substantial differences in the encoding quality of the content. The reference signatures can be used in manner similar to that discussed above for content identification. In one implementation of this application, a sequence of destination signatures is compared against a database of sequences of reference signatures. If a sequence of reference signatures is found that matches the sequence of destination signatures, then the destination content can be verified against the content that corresponds to the particular sequence of reference signatures. The synchronization signature constructs may include data that indicates when, where and by whom the synchronization signature construct was created. It may also include a digital signature that can be used to verify the destination content is the same as the reference content.

E. Implementation

Figure 15:
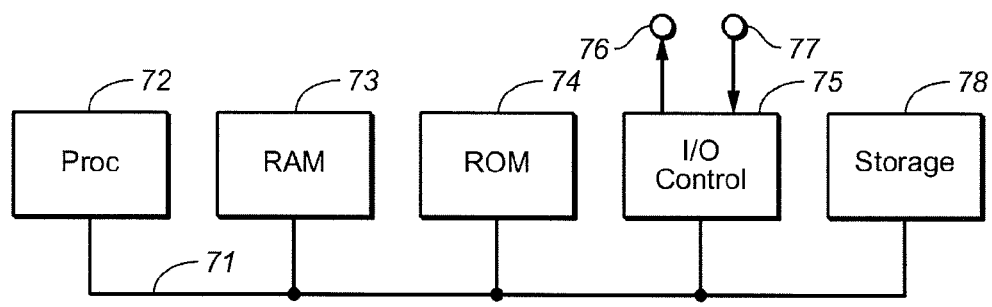
FIG. 15 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 15 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general-purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:

1. A method for calculating synchronization errors between destination video content and destination audio content, wherein the method comprises:
   receiving reference video signatures representing one or more video features of a reference video signal, reference audio signatures representing one or more audio features of a reference audio signal, and indications of relative temporal alignment of the video and audio features;
   generating one or more destination video signatures in response to one or more video features extracted from the destination video content;
   generating one or more destination audio signatures in response to one or more audio features extracted from the destination audio content;
   comparing a sequence of destination video signatures with a sequence of reference video signatures to find a match between the destination video content and the reference video content used to generate the reference video signatures;
   comparing a sequence of destination audio signatures with a sequence of reference audio signatures to find a match between the destination audio content and the reference audio content used to generate the reference audio signatures;
   calculating a synchronization error between the destination video content and the destination audio content by calculating a temporal misalignment between the identified destination video content and the identified destination audio content as compared with the relative temporal alignment of the video and audio features of the reference video signal and the reference audio signal;
   analyzing past synchronization errors and selecting a model of past synchronization errors that best represents the past synchronization errors, wherein the model may be selected from models that represent a sequence of synchronization errors that are constant, that increase or decrease at a linear rate, or that include an abrupt change in value, and wherein parameters for the selected model are derived to minimize differences between the selected model output and the past synchronization errors;
   storing the choice of the selected model and its parameters in a buffer;
   deriving a measure of reliability in the synchronization error from a difference between the calculated temporal misalignment and a predicted misalignment obtained from a sequence of previously calculated temporal misalignments;
   using the buffer of stored models to predict the synchronization error for intervals where the measures of reliability are below a threshold; and
   displaying the synchronization error, or correcting the synchronization error by delaying one or both of the destination video and the destination audio to bring them into proper temporal alignment.

2. A method for calculating synchronization errors between destination video content and destination audio content, wherein the method comprises:
   receiving reference video signatures representing one or more video features of a reference video signal, reference audio signatures representing one or more audio features of a reference audio signal, and indications of relative temporal alignment of the video and audio features;

generating one or more destination video signatures in response to one or more video features extracted from the destination video content;

generating one or more destination audio signatures in response to one or more audio features extracted from the destination audio content;

comparing a sequence of destination video signatures with a sequence of reference video signatures to find a match between the destination video content and the reference video content used to generate the reference video signatures, obtaining a relative video timing difference between the destination video signal and the reference video signal;

comparing a sequence of destination audio signatures with a sequence of reference audio signatures to find a match between the destination audio content and the reference audio content used to generate the reference audio signatures, obtaining a relative audio timing difference between the destination audio signal and the reference audio signal;

calculating a synchronization error between the destination video content and the destination audio content from the relative timing difference between the destination video signal and the reference video signal and from the relative timing difference between the destination audio signal and the reference audio signal as compared with the relative temporal alignment of the video and audio features of the reference video signal and the reference audio signal;

calculating a video-match confidence measure that represents a degree of certainty in the found match between the destination video content and the reference video content by analyzing past relative video timing differences and selecting a prediction model that best represents the past relative video timing differences, wherein the model may be selected from models that represent a sequence of timing differences that are constant, that increase or decrease at a linear rate, or that include an abrupt change in value, and wherein parameters for the selected model are derived to minimize differences between the selected model output and the past relative video timing differences;

calculating an audio-match confidence measure that represents a degree of certainty in the found match between the destination audio content and the reference audio content by analyzing past relative audio timing differences and selecting a prediction model that best represents the past relative audio timing differences, wherein the model may be selected from models that represent a sequence of timing differences that are constant, that increase or decrease at a linear rate, or that include an abrupt change in value, and wherein parameters for the selected model are derived to minimize differences between the selected model output and the past relative audio timing differences;

storing the choice of the selected models and their parameters in a buffer;

deriving a measure of reliability in the synchronization error from the video-match confidence measure and the audio-match confidence measure;

using the buffer of stored models to predict the synchronization error for intervals where the measures of reliability are below a threshold; and displaying the synchronization error, or correcting the synchronization error by delaying one or both of the destination video and the destination audio to bring them into proper temporal alignment.

3. The method of claim 1 or 2 that comprises:

deriving a probability of the synchronization error from a statistical model of synchronization errors; and using the buffer of stored models to predict the synchronization error for intervals where the probability of the synchronization error is below a threshold.

4. The method of claim 1 or 2 that comprises:

calculating a measure of confidence for the selected model; and storing the measure of confidence for the selected model in the buffer along with the choice of the selected model.

5. The method of claim 4 that comprises:

storing the choice of the selected model in the buffer if the measure of confidence in the selected model is greater than a threshold.

6. The method of claim 4 that comprises predicting the synchronization error using the stored model having the highest measure of confidence in that selected model.

7. The method of claim 4 that comprises predicting the synchronization error using a model derived from an average of model parameters stored in the buffer.

8. The method of claim 4 that comprises predicting the synchronization error using the model stored most often in the buffer.

9. The method of claim 2 that comprises calculating a weighted sum of video timing differences, each video timing difference weighted by a respective video-match confidence measure;

calculating a weighted sum of audio timing differences, each audio timing difference weighted by a respective audio-match confidence measure; and calculating the synchronization error from the weighted sum of video timing differences and the weighted sum of audio timing differences.

10. An apparatus for calculating synchronization errors between destination video content and destination audio content, wherein the apparatus comprises:

a receiver for receiving reference video signatures representing one or more video features of a reference video signal, reference audio signatures representing one or more audio features of a reference audio signal, and indications of relative temporal alignment of the video and audio features;

a generator for generating one or more destination video signatures in response to one or more video features extracted from the destination video content;

a generator for generating one or more destination audio signatures in response to one or more audio features extracted from the destination audio content;

a comparator for comparing a sequence of destination video signatures with a sequence of reference video signatures to find a match between the destination video content and the reference video content used to generate the reference video signatures;

a comparator for comparing a sequence of destination audio signatures with a sequence of reference audio signatures to find a match between the destination audio content and the reference audio content used to generate the reference audio signatures;

a calculator for calculating a synchronization error between the destination video content and the destination audio content by calculating a temporal misalignment between the identified destination video content and the identified destination audio content as compared with the relative temporal alignment of the video and audio features of the reference video signal and the reference audio signal;

an analyzer for analyzing past synchronization errors and for selecting a model of past synchronization errors that best represents the past synchronization errors, wherein the model may be selected from models that represent a sequence of synchronization errors that are constant, that increase or decrease at a linear rate, or that include an abrupt change in value, and wherein parameters for the selected model are derived to minimize differences between the selected model output and the past synchronization errors;

storage for storing the choice of the selected model and its parameters in a buffer;

a deriver for deriving a measure of reliability in the synchronization error from a difference between the calculated temporal misalignment and a predicted misalignment obtained from a sequence of previously calculated temporal misalignments;

a predictor for using the buffer of stored models to predict the synchronization error for intervals where the measures of reliability are below a threshold; and a display for displaying the synchronization error, or for correcting the synchronization error by delaying one or both of the destination video and the destination audio to bring them into proper temporal alignment.

11. An apparatus for calculating synchronization errors between destination video content and destination audio content, wherein the apparatus comprises:

a receiver for receiving reference video signatures representing one or more video features of a reference video signal, reference audio signatures representing one or more audio features of a reference audio signal, and indications of relative temporal alignment of the video and audio features;

a generator for generating one or more destination video signatures in response to one or more video features extracted from the destination video content;

a generator for generating one or more destination audio signatures in response to one or more audio features extracted from the destination audio content;

a comparator for comparing a sequence of destination video signatures with a sequence of reference video signatures to find a match between the destination video content and the reference video content used to generate the reference video signatures, obtaining a relative video timing difference between the destination video signal and the reference video signal;

a comparator for comparing a sequence of destination audio signatures with a sequence of reference audio signatures to find a match between the destination audio content and the reference audio content used to generate the reference audio signatures, obtaining a relative audio timing difference between the destination audio signal and the reference audio signal;

a calculator for calculating a synchronization error between the destination video content and the destination audio content from the relative timing difference between the destination video signal and the reference video signal and from the relative timing difference between the destination audio signal and the reference audio signal as compared with the relative temporal alignment of the video and audio features of the reference video signal and the reference audio signal;

a calculator for calculating a video-match confidence measure that represents a degree of certainty in the found match between the destination video content and the reference video content by analyzing past relative video timing differences and selecting a prediction model that best represents the past relative video timing differences, wherein the model may be selected from models that represent a sequence of timing differences that are constant, that increase or decrease at a linear rate, or that include an abrupt change in value, and wherein parameters for the selected model are derived to minimize differences between the selected model output and the past relative video timing differences;

a calculator for calculating an audio-match confidence measure that represents a degree of certainty in the found match between the destination audio content and the reference audio content by analyzing past relative audio timing differences and selecting a prediction model that best represents the past relative audio timing differences, wherein the model may be selected from models that represent a sequence of timing differences that are constant, that increase or decrease at a linear rate, or that include an abrupt change in value, and wherein parameters for the selected model are derived to minimize differences between the selected model output and the past relative audio timing differences;

storage for storing the choice of the selected models and their parameters in a buffer;

a deriver for deriving a measure of reliability in the synchronization error from the video-match confidence measure and the audio-match confidence measure;

a predictor for using the buffer of stored models to predict the synchronization error for intervals where the measures of reliability are below a threshold; and a display for displaying the synchronization error, or for correcting the synchronization error by delaying one or both of the destination video and the destination audio to bring them into proper temporal alignment.

12. The apparatus of claim 10 or 11 that comprises:
a deriver for deriving a probability of the synchronization error from a statistical model of synchronization errors; and
a predictor for using the buffer of stored models to predict the synchronization error for intervals where the probability of the synchronization error is below a threshold.

13. The apparatus of claim 10 or 11 that comprises:
a calculator for calculating a measure of confidence for the selected model; and
storage for storing the measure of confidence for the selected model in the buffer along with the choice of the selected model.

14. The apparatus of claim 13 that comprises storage for storing the choice of the selected model in the buffer if the measure of confidence in the selected model is greater than a threshold.

15. The apparatus of claim 13 that comprises a predictor for predicting the synchronization error using the stored model having the highest measure of confidence in that selected model.

16. The apparatus of claim 13 that comprises a predictor for predicting the synchronization error using a model derived from an average of model parameters stored in the buffer.

17. The apparatus of claim 13 that comprises a predictor for predicting the synchronization error using the model stored most often in the buffer.

18. The apparatus of claim 11 that comprises:
- a calculator for calculating a weighted sum of video timing differences, each video timing difference weighted by a respective video-match confidence measure;
- a calculator for calculating a weighted sum of audio timing differences, each audio timing difference weighted by a respective audio-match confidence measure; and
- a calculator for calculating the synchronization error from the weighted sum of video timing differences and the weighted sum of audio timing differences.

19. A non-transitory medium that stores a program of instructions and is readable by a computer for executing the program of instructions to perform a method for calculating synchronization errors between destination video content and destination audio content, wherein the method comprises:
- receiving reference video signatures representing one or more video features of a reference video signal, reference audio signatures representing one or more audio features of a reference audio signal, and indications of relative temporal alignment of the video and audio features;
- generating one or more destination video signatures in response to one or more video features extracted from the destination video content;
- generating one or more destination audio signatures in response to one or more audio features extracted from the destination audio content;
- comparing a sequence of destination video signatures with a sequence of reference video signatures to find a match between the destination video content and the reference video content used to generate the reference video signatures;
- comparing a sequence of destination audio signatures with a sequence of reference audio signatures to find a match between the destination audio content and the reference audio content used to generate the reference audio signatures;
- calculating a synchronization error between the destination video content and the destination audio content by calculating a temporal misalignment between the identified destination video content and the identified destination audio content as compared with the relative temporal alignment of the video and audio features of the reference video signal and the reference audio signal;
- analyzing past synchronization errors and selecting a model of past synchronization errors that best represents the past synchronization errors, wherein the model may be selected from models that represent a sequence of synchronization errors that are constant, that increase or decrease at a linear rate, or that include an abrupt change in value, and wherein parameters for the selected model are derived to minimize differences between the selected model output and the past synchronization errors;
- storing the choice of the selected model and its parameters in a buffer;
- deriving a measure of reliability in the synchronization error from a difference between the calculated temporal misalignment and a predicted misalignment obtained from a sequence of previously calculated temporal misalignments;
- using the buffer of stored models to predict the synchronization error for intervals where the measures of reliability are below a threshold; and
- displaying the synchronization error, or correcting the synchronization error by delaying one or both of the destination video and the destination audio to bring them into proper temporal alignment.

20. A non-transitory medium that stores a program of instructions and is readable by a computer for executing the program of instructions to perform a method for calculating synchronization errors between destination video content and destination audio content, wherein the method comprises:
- receiving reference video signatures representing one or more video features of a reference video signal, reference audio signatures representing one or more audio features of a reference audio signal, and indications of relative temporal alignment of the video and audio features;
- generating one or more destination video signatures in response to one or more video features extracted from the destination video content;
- generating one or more destination audio signatures in response to one or more audio features extracted from the destination audio content;
- comparing a sequence of destination video signatures with a sequence of reference video signatures to find a match between the destination video content and the reference video content used to generate the reference video signatures, obtaining a relative video timing difference between the destination video signal and the reference video signal;
- comparing a sequence of destination audio signatures with a sequence of reference audio signatures to find a match between the destination audio content and the reference audio content used to generate the reference audio signatures, obtaining a relative audio timing difference between the destination audio signal and the reference audio signal;
- calculating a synchronization error between the destination video content and the destination audio content from the relative timing difference between the destination video signal and the reference video signal and from the relative timing difference between the destination audio signal and the reference audio signal as compared with the relative temporal alignment of the video and audio features of the reference video signal and the reference audio signal;
- calculating a video-match confidence measure that represents a degree of certainty in the found match between the destination video content and the reference video content by analyzing past relative video timing differences and selecting a prediction model that best represents the past relative video timing differences, wherein the model may be selected from models that represent a sequence of timing differences that are constant, that increase or decrease at a linear rate, or that include an abrupt change in value, and wherein parameters for the selected model are derived to minimize differences between the selected model output and the past relative video timing differences;
- calculating an audio-match confidence measure that represents a degree of certainty in the found match between the destination audio content and the reference audio content by analyzing past relative audio timing differences and selecting a prediction model that best represents the past relative audio timing differences, wherein the model may be selected from models that represent a sequence of timing differences that are constant, that increase or decrease at a linear rate, or that include an abrupt change in value, and wherein parameters for the selected model are derived to minimize differences between the selected model output and the past relative audio timing differences;

storing the choice of the selected models and their parameters in a buffer;

deriving a measure of reliability in the synchronization error from the video-match confidence measure and the audio-match confidence measure;

using the buffer of stored models to predict the synchronization error for intervals where the measures of reliability are below a threshold; and displaying the synchronization error, or correcting the synchronization error by delaying one or both of the destination video and the destination audio to bring them into proper temporal alignment.

21. The medium of claim 19 or 20, wherein the method comprises:

deriving a probability of the synchronization error from a statistical model of synchronization errors; and using the buffer of stored models to predict the synchronization error for intervals where the probability of the synchronization error is below a threshold.

22. The medium of claim 19 or 20, wherein the method comprises:

calculating a measure of confidence for the selected model; and storing the measure of confidence for the selected model in the buffer along with the choice of the selected model.

23. The medium of claim 22, wherein the method comprises storing the choice of the selected model in the buffer if the measure of confidence in the selected model is greater than a threshold.

24. The medium of claim 22, wherein the method comprises predicting the synchronization error using the stored model having the highest measure of confidence in that selected model.

25. The medium of claim 22, wherein the method comprises predicting the synchronization error using a model derived from an average of model parameters stored in the buffer.

26. The medium of claim 22, wherein the method comprises predicting the synchronization error using the model stored most often in the buffer.

27. The medium of claim 20, wherein the method comprises:

calculating a weighted sum of video timing differences, each video timing difference weighted by a respective video-match confidence measure;

calculating a weighted sum of audio timing differences, each audio timing difference weighted by a respective audio-match confidence measure; and calculating the synchronization error from the weighted sum of video timing differences and the weighted sum of audio timing differences.

* * * * *